US 011911844B2

(12) United States Patent
Shibazaki

(10) Patent No.: US 11,911,844 B2
(45) Date of Patent: Feb. 27, 2024

(54) SHAPING APPARATUS AND SHAPING METHOD

(71) Applicant: NIKON CORPORATION, Tokyo (JP)

(72) Inventor: Yuichi Shibazaki, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 115 days.

(21) Appl. No.: 17/386,215

(22) Filed: Jul. 27, 2021

(65) Prior Publication Data

US 2021/0354243 A1 Nov. 18, 2021

Related U.S. Application Data

(63) Continuation of application No. 15/590,311, filed on May 9, 2017, now Pat. No. 11,161,202, which is a (Continued)

(51) Int. Cl.
*B23K 26/342* (2014.01)
*B22F 10/20* (2021.01)
(Continued)

(52) U.S. Cl.
CPC .......... *B23K 26/0665* (2013.01); *B22F 12/22* (2021.01); *B22F 12/44* (2021.01);
(Continued)

(58) Field of Classification Search
CPC ............ B23K 26/0665; B23K 26/0626; B23K 26/144; B23K 26/342; B23K 26/08;
(Continued)

(56) References Cited

U.S. PATENT DOCUMENTS 5,837,960 A 11/1998 Lewis et al.
5,846,678 A 12/1998 Nishigori et al.
(Continued)

FOREIGN PATENT DOCUMENTS

CN 1608832 A 4/2005
CN 101002300 A 7/2007
(Continued)

OTHER PUBLICATIONS

May 2, 2023 Office Action issued in U.S. Appl. No. 17/384,005.
(Continued)

*Primary Examiner* — Dana Ross
*Assistant Examiner* — Kuangyue Chen
(74) *Attorney, Agent, or Firm* — Oliff PLC

(57) ABSTRACT

A shaping apparatus is equipped with: a beam shaping system having a beam irradiation section that includes a condensing optical system which emits a beam and a material processing section which supplies a shaping material irradiated by the beam from the beam irradiation section; and a controller which, on the basis of 3D data of a three-dimensional shaped object to be formed on a target surface, controls a workpiece movement system and the beam shaping system such that a target portion on the target surface is shaped by supplying the shaping material from the material processing section while moving the beam from the beam irradiation section and the target surface on a workpiece (or a table) relative to each other. Further the intensity distribution of the beam in the shaping plane facing the emitting surface of the condensing optical system can be modified.

22 Claims, 15 Drawing Sheets

Related U.S. Application Data continuation of application No. PCT/JP2014/080150, filed on Nov. 14, 2014.

(51) Int. Cl.

| | | |
|---|---|---|
| *B22F 12/00* | (2021.01) | |
| *B22F 12/44* | (2021.01) | |
| *B22F 12/45* | (2021.01) | |
| *B22F 12/53* | (2021.01) | |
| *B23K 26/06* | (2014.01) | |
| *B23K 26/08* | (2014.01) | |
| *B23K 26/144* | (2014.01) | |
| *B33Y 10/00* | (2015.01) | |
| *B33Y 30/00* | (2015.01) | |
| *B33Y 50/02* | (2015.01) | |
| *B22F 3/24* | (2006.01) | |
| *B22F 10/25* | (2021.01) | |
| *B22F 10/362* | (2021.01) | |
| *B22F 10/66* | (2021.01) | |
| *B22F 12/41* | (2021.01) | |
| *B22F 12/90* | (2021.01) | |
| *G02B 26/00* | (2006.01) | |

(52) U.S. Cl.
CPC .............. *B22F 12/45* (2021.01); *B22F 12/53* (2021.01); *B23K 26/0626* (2013.01); *B23K 26/08* (2013.01); *B23K 26/144* (2015.10); *B23K 26/342* (2015.10); *B33Y 10/00* (2014.12); *B33Y 30/00* (2014.12); *B33Y 50/02* (2014.12); *B22F 2003/247* (2013.01); *B22F 10/25* (2021.01); *B22F 10/362* (2021.01); *B22F 10/66* (2021.01); *B22F 12/41* (2021.01); *B22F 12/90* (2021.01); *G02B 26/00* (2013.01); *G02F 2203/12* (2013.01); *Y02P 10/25* (2015.11)

(58) Field of Classification Search
CPC .......... B22F 12/53; B22F 12/45; B22F 12/22; B22F 12/44; B22F 2003/247; B22F 10/362; B22F 12/41; B22F 10/25; B22F 10/66; B22F 12/90; B33Y 30/00; B33Y 50/02; B33Y 10/00; G02F 2203/12; G02B 26/00; Y02P 10/25

See application file for complete search history.

(56) References Cited

U.S. PATENT DOCUMENTS

| | | | |
|---|---|---|---|
| 5,993,554 A | 11/1999 | Keicher et al. | |
| 6,054,192 A | 4/2000 | Otsuka et al. | |
| 6,122,564 A | 9/2000 | Koch et al. | |
| 6,180,049 B1 | 1/2001 | Jang et al. | |
| 6,203,861 B1 | 3/2001 | Kar et al. | |
| 6,590,633 B1 | 7/2003 | Nishi et al. | |
| 6,737,662 B2 | 5/2004 | Mulder et al. | |
| 6,940,582 B1 | 9/2005 | Tanaka | |
| 7,009,717 B2 | 3/2006 | Van Coppenolle et al. | |
| 8,121,717 B2 | 2/2012 | Idaka et al. | |
| 8,456,624 B2 | 6/2013 | Tanitsu et al. | |
| 9,776,364 B2 | 10/2017 | Wang | |
| 2001/0032666 A1 | 10/2001 | Jenson et al. | |
| 2002/0041818 A1 | 4/2002 | Abe et al. | |
| 2002/0153361 A1* | 10/2002 | Sakamoto .......... B23K 26/0608 | |
| | | | 219/121.73 |
| 2003/0052105 A1 | 3/2003 | Nagano et al. | |
| 2003/0075529 A1 | 4/2003 | Mazumder et al. | |
| 2003/0132207 A1* | 7/2003 | Park .................... B24D 11/001 | |
| | | | 219/121.72 |
| 2003/0206820 A1 | 11/2003 | Keicher et al. | |
| 2003/0214571 A1 | 11/2003 | Ishikawa et al. | |
| 2004/0223132 A1 | 11/2004 | Nishi et al. | |
| 2004/0251242 A1 | 12/2004 | Suh | |
| 2005/0116391 A1 | 6/2005 | Lindemann et al. | |
| 2006/0062265 A1 | 3/2006 | Denney et al. | |
| 2006/0165546 A1 | 7/2006 | Yamada et al. | |
| 2007/0008311 A1 | 1/2007 | Yoshino et al. | |
| 2007/0252309 A1 | 11/2007 | Higashi et al. | |
| 2008/0030852 A1 | 2/2008 | Shigematsu | |
| 2008/0043236 A1 | 2/2008 | Kaise et al. | |
| 2008/0178994 A1 | 7/2008 | Qi et al. | |
| 2008/0223832 A1 | 9/2008 | Song et al. | |
| 2009/0025638 A1 | 1/2009 | Inoue | |
| 2009/0239315 A1 | 9/2009 | Lee | |
| 2010/0316943 A1 | 12/2010 | Tanitsu et al. | |
| 2011/0069305 A1 | 3/2011 | Tanitsu et al. | |
| 2011/0266261 A1 | 11/2011 | Nakano et al. | |
| 2012/0064460 A1 | 3/2012 | Aoki | |
| 2012/0105867 A1 | 5/2012 | Komatsu | |
| 2012/0266814 A1 | 10/2012 | Clark et al. | |
| 2012/0267345 A1 | 10/2012 | Clark et al. | |
| 2012/0267347 A1 | 10/2012 | Arjakine et al. | |
| 2013/0176375 A1 | 7/2013 | Moench et al. | |
| 2013/0284708 A1 | 10/2013 | Mizumura | |
| 2014/0031176 A1 | 1/2014 | Knopow et al. | |
| 2014/0070073 A1 | 3/2014 | Ishizuka et al. | |
| 2014/0081602 A1 | 3/2014 | Asamizu et al. | |
| 2014/0263209 A1 | 9/2014 | Burris et al. | |
| 2014/0334924 A1 | 11/2014 | Satzger et al. | |
| 2015/0064048 A1 | 3/2015 | Bessac et al. | |
| 2015/0140230 A1* | 5/2015 | Jones ..................... B33Y 80/00 |
| | | | 427/457 |
| 2015/0306819 A1 | 10/2015 | Ljungblad | |

FOREIGN PATENT DOCUMENTS

| | | | |
|---|---|---|---|
| CN | 102383126 A | 3/2012 | |
| CN | 102639283 A | 8/2012 | |
| CN | 102764889 A | 11/2012 | |
| CN | 102869474 A | 1/2013 | |
| CN | 203875342 U | 10/2014 | |
| CN | 104136149 A | 11/2014 | |
| DE | 101 48 967 A1 | 4/2002 | |
| EP | 1 752 240 A1 | 2/2007 | |
| EP | 1 911 568 A1 | 4/2008 | |
| EP | 2 514 554 A1 | 10/2012 | |
| JP | H07-304104 A | 11/1995 | |
| JP | H08-156106 A | 6/1996 | |
| JP | H08156106 A | 6/1996 | |
| JP | H08156106 A * | 6/1996 | ............. B29C 35/02 |
| JP | H09-001674 A | 1/1997 | |
| JP | H091674 A * | 1/1997 | ............. B29C 35/08 |
| JP | H09001674 A | 1/1997 | |
| JP | H10-211658 A | 8/1998 | |
| JP | H11-77361 A | 3/1999 | |
| JP | 2002-069507 A | 3/2002 | |
| JP | 2002-115004 A | 4/2002 | |
| JP | 2002-519200 A | 7/2002 | |
| JP | 2003-321704 A | 11/2003 | |
| JP | 2003-340924 A | 12/2003 | |
| JP | 2004-001500 A | 1/2004 | |
| JP | 2005-509523 A | 4/2005 | |
| JP | 2006-200030 A | 8/2006 | |
| JP | 2007-192675 A | 8/2007 | |
| JP | 2007301980 A | 11/2007 | |
| JP | 2008-190038 A | 8/2008 | |
| JP | 2008-307895 A | 12/2008 | |
| JP | 2009-302208 A | 12/2009 | |
| JP | 2010-255057 A | 11/2010 | |
| JP | 2011-222856 A | 11/2011 | |
| JP | 2013-542401 A | 11/2013 | |
| JP | 2014-59672 A | 4/2014 | |
| KR | 101459284 B1 | 11/2014 | |
| TW | I280899 B | 5/2007 | |
| WO | 00/00921 A1 | 1/2000 | |
| WO | 2007/013240 A1 | 2/2007 | |

(56) References Cited

FOREIGN PATENT DOCUMENTS

| WO | 2014/042970 A1 | 3/2014 |
|----|----------------|--------|
| WO | 2014/095208 A1 | 6/2014 |

OTHER PUBLICATIONS

Dec. 7, 2021 Office Action issued in Japanese Patent Application No. 2019-064191.
Takizawa Shuichi, "3D printer, heat process and surface process for metal laminated structural body", Japan, published Dec. 27, 2013, vol. 54 No. 17, pp. 66 to 73.
Nov. 19, 2021 Office Action issued in Korean Patent Application No. 10-2021-7023406.
Dec. 28, 2021 Office Action issued in Chinese Patent Application No. 202010552024.3.
Dec. 16, 2021 Office Action issued in Chinese Patent Application No. 202010552015.4.
Apr. 12, 2022 Office Action issued in Japanese Patent Application No. 2021-096673.
Jan. 18, 2023 Office Action issued in Chinese Patent Application No. 202010552024.3.
Jan. 28, 2023 Office Action issued in Chinese Patent Application No. 202010552015.4.
Wang Yungan et al., 3D Printing Technique. Huazhong University of Science and Technology Press, Jul. 2013. p. 124.
Sep. 22, 2022 Office Action issued in Korean Patent Application No. 10-2021-7023406.
Nov. 3, 2022 Office Action issued in Chinese Patent Application No. 202010552032.8.
Jul. 27, 2021 Office Action issued in Chinese Patent Application No. 202010004730.4.
Jul. 30, 2021 Office Action issued in Chinese Patent Application No. 202010004724.9.
Jul. 6, 2021 Office Action issued in Chinese Patent Application No. 202010004736.1.
Oct. 4, 2022 Written Patent Opposition issued in Japanese Patent No. 7,047,864.
Almir Heralic et al., "Height control of laser metal-wire deposition based on iterative learning control and 3D scanning", Optics and Lasers in Engineering 50 (2012), pp. 1230-1241.
Apr. 1, 2023 Office Action issued in Chinese Patent Application No. 202010552032.8.
Apr. 20, 2022 Office Action issued in Chinese Patent Application No. 202010004730.4.
Mar. 15, 2022 Office Action issued in Chinese Patent Application No. 202010004724.9.
Mar. 3, 2022 Office Action issued in Chinese Patent Application No. 202010004930.X.
Mar. 17, 2022 Office Action issued in Chinese Patent Application No. 202010004736.1.
Mar. 4, 2022 Office Action issued in Chinese Patent Application No. 202010004929.7.
Mar. 3, 2022 Office Action issued in Chinese Patent Application No. 202010552032.8.
Dec. 27, 2022 Office Action issued in Japanese Patent Application No. 2022-041056.
Oct. 25, 2022 Office Action issued in Chinese Patent Application No. 202010004730.4.
Feb. 17, 2015 International Search Report issued in International Patent Application No. PCT/JP2014/080150.
May 16, 2017 International Preliminary Report on Patentability issued in International Patent Application No. PCT/JP2014/080150.
Feb. 17, 2015 International Search Report issued in International Application No. PCT/JP2014/080151.
May 16, 2017 International Preliminary Report on Patentability issued in International Application No. PCT/JP2014/080151.
Jun. 12, 2018 Partial Supplemental Search Report issued in European Application No. 14905892.7.
Aug. 10, 2018 Office Action issued in Japanese Application No. 2016-558516.
Aug. 24, 2018 Extended Search Report issued in European Application No. 14905921.4.
Aug. 10, 2018 Office Action issued in Japanese Application No. 2016-558515.
English-language translation of JP H08-156106 A.
English-language translation of JP H09-001674 A.
English-language translation of JP 2003-321704 A.
Oct. 24, 2018 Office Action issued in Chinese Application No. 201480083369.1.
Dec. 10, 2018 Office Action issued in Taiwanese Application No. 104137319.
Feb. 5, 2019 Decision of Refusal issued in Japanese Application No. 2016-558515.
Feb. 25, 2019 Decision of Refusal issued in Japanese Application No. 2016-558516.
Feb. 25, 2019 Extended Search Report issued in European Application No. 14905892.7.
Mar. 1, 2019 Office Action issued in Japanese Application No. 2018-066310.
Mar. 1, 2019 Office Action issued in Japanese Application No. 2018-066311.
Mar. 1, 2019 Office Action issued in Japanese Application No. 2018-066312.
Apr. 18, 2019 Office Action issued in Chinese Patent Application No. 201480083454.8.
Jun. 25, 2019 Office Action issued in U.S. Appl. No. 15/590,311.
Jun. 7, 2019 Office Action issued in European Patent Application No. 14905921.4.
Aug. 14, 2019 Office Action Issued in U.S. Appl. No. 15/590,311.
May 2, 2019 Office Action issued in Taiwanese Patent Application No. 104137318.
Aug. 8, 2019 Office Action issued in Taiwanese Patent Application No. 108120318.
Aug. 20, 2019 Preliminary Examination Decision issued in Taiwanese Patent Application No. 104137319.
Dec. 2, 2019 Decision of Refusal issued in Japanese Patent Application No. 2018-066310.
Dec. 2, 2019 Decision of Refusal issued in Japanese Patent Application No. 2018-066311.
Dec. 2, 2019 Decision of Refusal issued in Japanese Patent Application No. 2018-066312.
Mar. 4, 2020 Office Action issued in Japanese Patent Application No. 20019-064191.
Apr. 15, 2020 Office Action issued in U.S. Appl. No. 15/590,311.
Mar. 10, 2020 Office Action issued in Taiwanese Patent Application No. 104137318.
May 22, 2020 Office Action issued in Taiwanese Patent Application No. 108139494.
Oct. 12, 2020 Decision of Refusal issued in Japanese Patent Application No. 2019-064191.
Oct. 26, 2020 Office Action issued in Korean Patent Application No. 10-2017-7015727.
Oct. 26, 2020 Office Action issued in Korean Patent Application No. 10-2017-7015728.
Oct. 27, 2020 Extended Search Report issued in European Patent Application No. 20 18 4192.1.
Nov. 6, 2020 Office Action issued in U.S. Appl. No. 15/590,312.
Jan. 11, 2021 Office Action issued in U.S. Appl. No. 15/590,311.
Feb. 25, 2021 Office Action issued in U.S. Appl. No. 15/590,312.
Apr. 29, 2021 Notice of Allowance issued in U.S. Appl. No. 15/590,311.
Apr. 8, 2021 Office Action issued in European Patent Application No. 14 905 921.4.
Apr. 13, 2021 Office Action issued in Japanese Patent Application No. 2018-066311.
Apr. 23, 2021 Notice of Allowance issued in Korean Patent Application No. 10-2017-7015727.
Apr. 23, 2021 Notice of Allowance issued in Korean Patent Application No. 10-2017-7015728.
May 11, 2021 Notice of Allowance issued in Japanese Patent Application No. 2018-066310.

(56) References Cited

OTHER PUBLICATIONS

May 11, 2021 Notice of Allowance issued in Japanese Patent Application No. 2018-066312.
Jun. 15, 2021 Office Action issued in Japanese Patent Application No. 2020-106953.
Jul. 1, 2021 Office Action issued in Chinese Patent Application No. 202010004929.7.
Jul. 6, 2021 Office Action issued in Chinese Patent Application No. 202010004930.X.
Jul. 22, 2022 Office Action issued in Chinese Patent Application No. 202010552015.4.
Jul. 29, 2022 Office Action issued in Chinese Patent Application No. 202010004930.X.
Aug. 24, 2022 Office Action issued in Chinese Patent Application No. 202010004724.9.
Sep. 1, 2022 Office Action issued in Chinese Patent Application No. 202010552024.3.
Sep. 6, 2022 Office Action issued in Japanese Patent Application No. 2021-096673.
Jun. 30, 2023 Office Action issued in Chinese Patent Application No. 202010552024.3.
Jul. 6, 2023 Office Action issued in Chinese Patent Application No. 202010552015.4.
Jul. 25, 2023 Office Action issued in Japanese Patent Application No. 2022-041056.
Jul. 28, 2023 Office Action issued in European Patent Application No. 20 184 192.1.
Aug. 23, 2023 Notice of Allowance issued in U.S. Appl. No. 17/384,005.
Jan. 3, 2024 Office Action issued in European Patent Application No. 14 905 921.4.

* cited by examiner

Fig. 10

—————————— STRAIGHT LINE AREA

══════════ THREE LINE AREA

— — — BROKEN STRAIGHT LINE AREA

SHAPE TO BE GENERATED

SHAPE TO BE GENERATED

SHAPING APPARATUS AND SHAPING METHOD

CROSS-REFERENCE TO RELATED APPLICATIONS

This is a Continuation of U.S. patent application Ser. No. 15/590,311 filed May 9, 2017 (now U.S. Pat. No. 11,161, 202), which in turn is a continuation of International Application No. PCT/JP2014/080150, with an international filing date of Nov. 14, 2014. The disclosure of each of the above-identified applications is hereby incorporated herein by reference in its entirety.

BACKGROUND OF THE INVENTION

Field of the Invention

The present invention relates to a shaping apparatus and a shaping method, and more particularly to a shaping apparatus and a shaping method to form a three-dimensional shaped object on a target surface. The shaping apparatus and the shaping method related to the present invention can be suitably applied when forming three-dimensional shaped objects by rapid prototyping (may also be called 3D printing, additive manufacturing, or direct digital manufacturing).

Description of the Background Art

Technology of forming a 3D (three-dimensional) shape directly from CAD data is called rapid prototyping (also may be called 3D printing, additive manufacturing, or direct digital manufacturing, but rapid prototyping will be used in general below), and has contributed mainly to make prototypes aimed for confirming shapes in an extremely short lead time. Shaping apparatus that form three-dimensional shaped objects by rapid prototyping such as a 3D printer can be broadly classified, when classified by materials which are handled, into devices that handle resin and devices that handle metal. Metallic three-dimensional shaped objects fabricated by rapid prototyping are used exclusively as actual parts, unlike the case of objects made by resin. That is, the parts are used such that they function as a part of an actual machine structure (whether the actual machine be mass produced or prototypes), and not as prototype parts for confirming shapes. As existing metallic 3D printers (hereinafter shortly referred to as M3DP (Metal 3D printer)), two types, PBF (Powder Bed Fusion) and DED (Directed Energy Deposition) are well known.

In PBF printers, a thin layer of powdered sintered metal is formed on a bed where an object to be worked is mounted, a high power laser beam is scanned thereon using a galvano mirror or the like, and the part where the beam hits is melted and solidified. When drawing of one layer is completed, the bed is lowered by one layer thickness, spreading of powdered sintered metal is resumed thereon, and the same process is repeated. Shaping is repeated layer by layer in the manner described above so that the desired three-dimensional shape can be acquired.

PBF substantially has some problems due to its shaping principle, such as; (1) insufficient fabrication accuracy of parts, (2) high roughness in surface finish, (3) slow processing speed, and (4) troublesome sintered metal powder handling that takes time and effort.

In DED printers, a method of depositing melted metal material on a processing subject is employed. For example, powdered metal is jetted around the focus of a laser beam condensed by a condensing lens. The powdered metal melts into a liquid form by irradiation of a laser. When the processing subject is located around the focus, the liquefied metal is deposited on the processing subject, cooled, and then is solidified again. This focal part is, in a way, the tip of a pen that allows successive drawing of "lines with thickness" on the processing subject surface. A desired shape can be formed by one of the processing subject and a processing head (as in a laser and a powder jet nozzle) moving relatively in an appropriate manner on the basis of CAD data, with respect to the other (for example, refer to U.S. Patent Application Publication No. 2003/0206820).

As it can be seen from this, with DED, because powder material is jetted from the processing head by a necessary amount only when necessary, this saves waste and processing does not have to be performed in a large amount of surplus powder.

As described above, although DED has been improved compared to PBF on points such as handling of powder metal as a raw material, there still are many points to be improved.

Under such circumstances, it is strongly hoped that convenience as a machine tool of a shaping apparatus that forms a three-dimensional shaped object is to be improved, that is to say, economic rationality of manufacturing is to be improved.

SUMMARY OF THE INVENTION

According to a first aspect of the present invention, there is provided a shaping apparatus that forms a three-dimensional shaped object on a target surface, comprising: a movement system that moves the target surface; a beam shaping system that has a beam irradiation section including a condensing optical system which emits a beam and a material processing section which supplies shaping material to be irradiated by the beam from the beam irradiation section; and a controller that controls the movement system and the beam shaping system based on 3D data of a three-dimensional shaped object to be formed on the target surface, so that shaping is applied to the target portion on the target surface by supplying the shaping material from the material processing section while relative movement of the target surface and the beam from the beam irradiation section is performed, wherein intensity distribution of the beam within a predetermined plane at an exit surface side of the condensing optical system can be changed.

Here, the target surface is a surface where the target portion of shaping is set, and the predetermined plane may be a virtual surface where the target surface is to be positioned for the shaping. The predetermined plane, for example, may be a surface perpendicular to an optical axis of the condensing optical system. The predetermined plane may be a rear focal plane of the condensing optical system or its neighboring surface.

According to this apparatus, it becomes possible to form a three-dimensional shaped object on the target surface with good processing accuracy.

According to a second aspect of the present invention, there is provided a shaping method of forming a three-dimensional shaped object on a target surface, comprising: controlling movement of the target surface and at least one of an irradiating state of a beam from a beam irradiation section including a condensing optical system and a supply state of a shaping material to be irradiated by the beam based on 3D data of the three-dimensional shaped object which is to be formed on the target surface, such that shaping is applied to a target portion on the target surface by supplying the shaping material while performing relative movement between the beam emitted from the beam irradiation section and the target surface, wherein intensity distribution of the beam within a predetermined plane on an exit surface side of the condensing optical system can be changed.

According to this method, it becomes possible to form a three-dimensional shaped object on the target surface with good processing accuracy.

BRIEF DESCRIPTION OF DRAWINGS

In the accompanying drawings:

FIG. 10 is a view showing an example of an irradiation area of a beam formed on a shaping surface;

DESCRIPTION OF EMBODIMENTS

Figure 1:
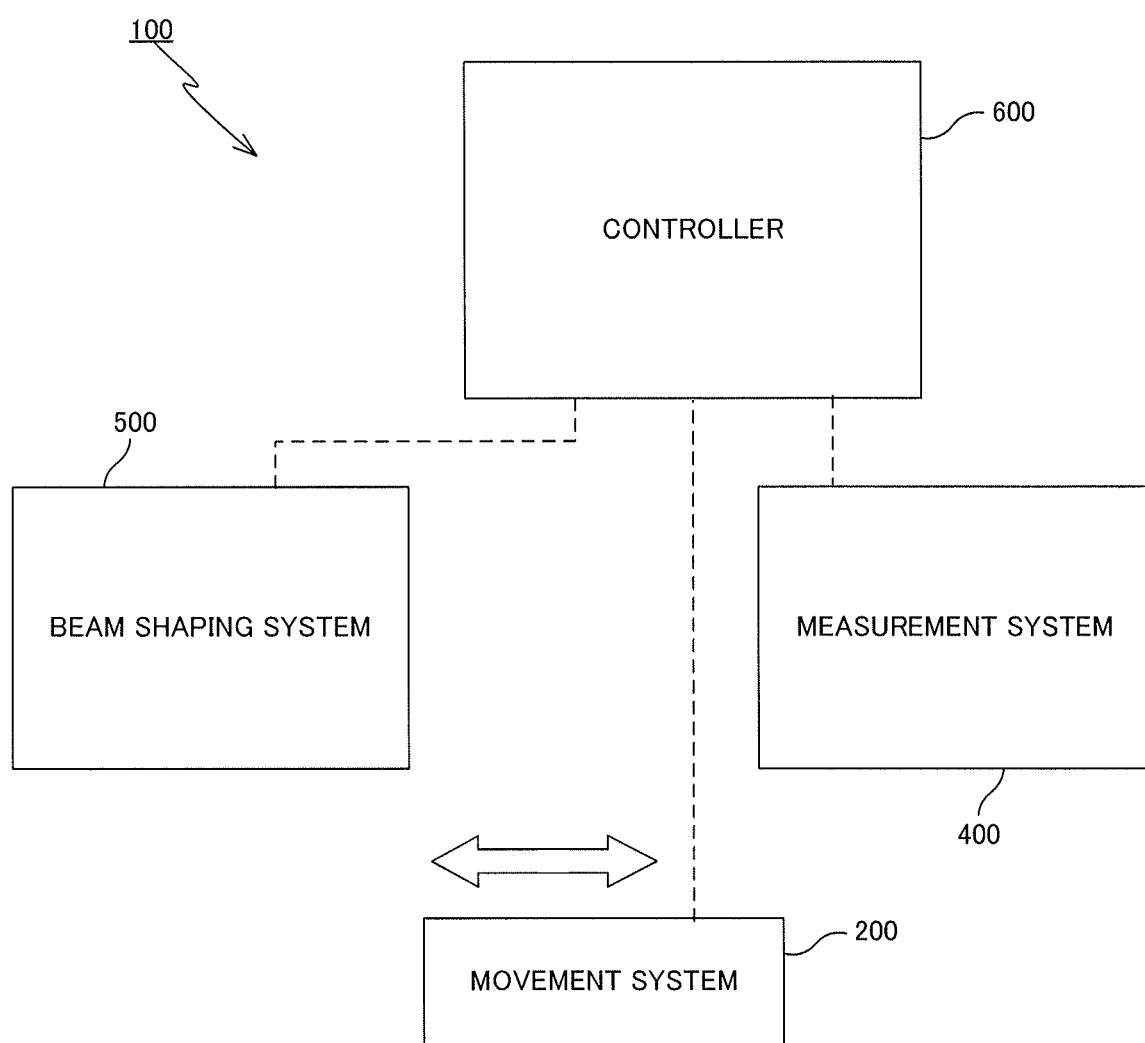
FIG. 1 is a block diagram showing an overall structure of a shaping apparatus according to an embodiment.

Hereinafter, an embodiment will be described with reference to FIGS. 1 to 15B. FIG. 1 is a block diagram showing an entire structure of a shaping apparatus 100 according to the embodiment.

Shaping apparatus 100 is a M3DP (Metal 3D printer) that employs DED (Directed Energy Deposition). Shaping apparatus 100 can be used to form a three-dimensional shaped object on a table 12 to be described later by rapid prototyping, as well as to perform additive manufacturing by three-dimensional shaping on a workpiece (e.g. an existing component). The present embodiment will focus on describing the latter case where additive manufacturing is performed on the workpiece. At the actual manufacturing site, it is common to make a desired component by further repeating processing on a component formed using a different manufacturing method, a different material, or a different machine tool, and the requirement is potentially the same for additive manufacturing by three-dimensional shaping.

Shaping apparatus 100 is equipped with; a movement system 200, a measurement system 400, and a beam shaping system 500, and a controller 600 including these systems that has overall control of shaping apparatus 100. Of these parts, measurement system 400, and beam shaping system 500 are placed spaced apart in a predetermined direction. In the description below, for the sake of convenience, measurement system 400, and beam shaping system 500 are to be placed spaced apart in an X-axis direction (refer to FIG. 2) to be described later on.

Figure 2:
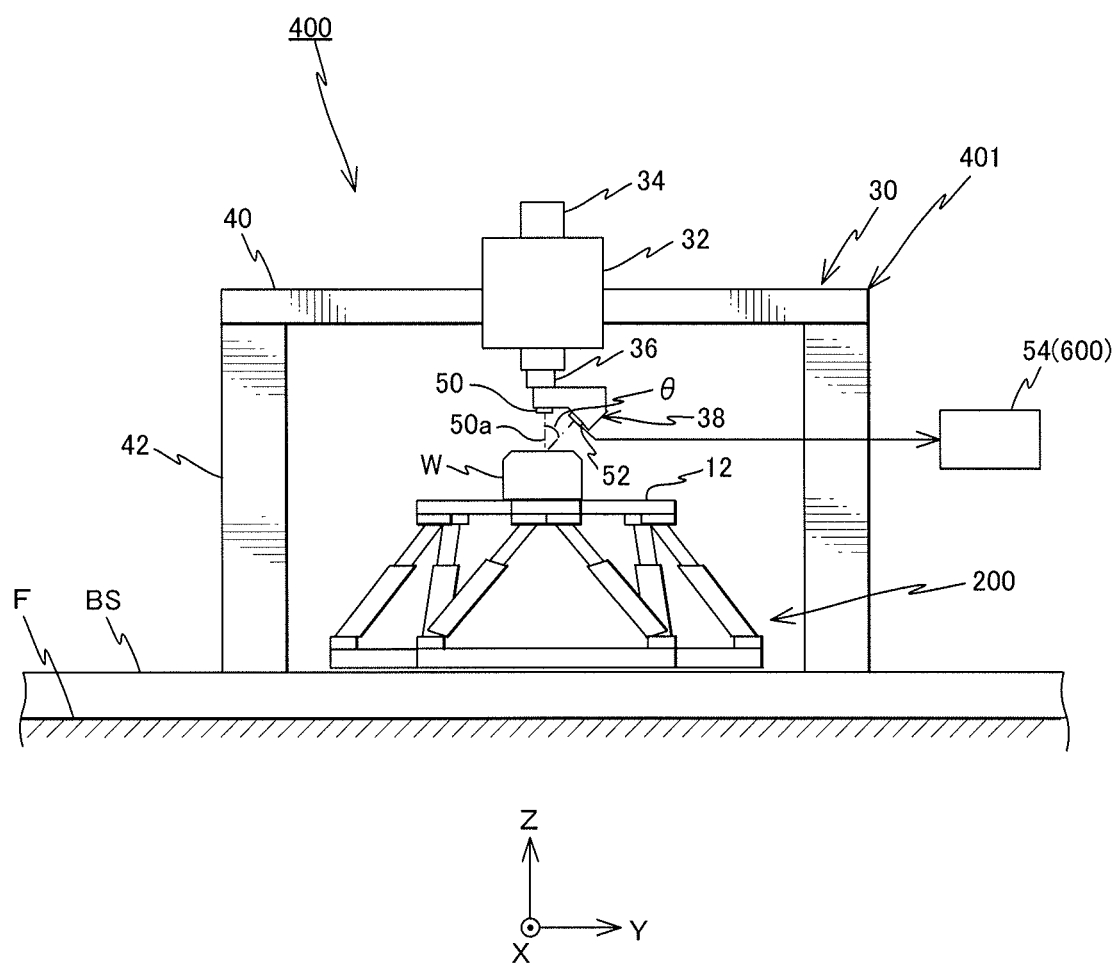
FIG. 2 is a view schematically showing a structure of a movement system along with a measurement system.
Figure 3:
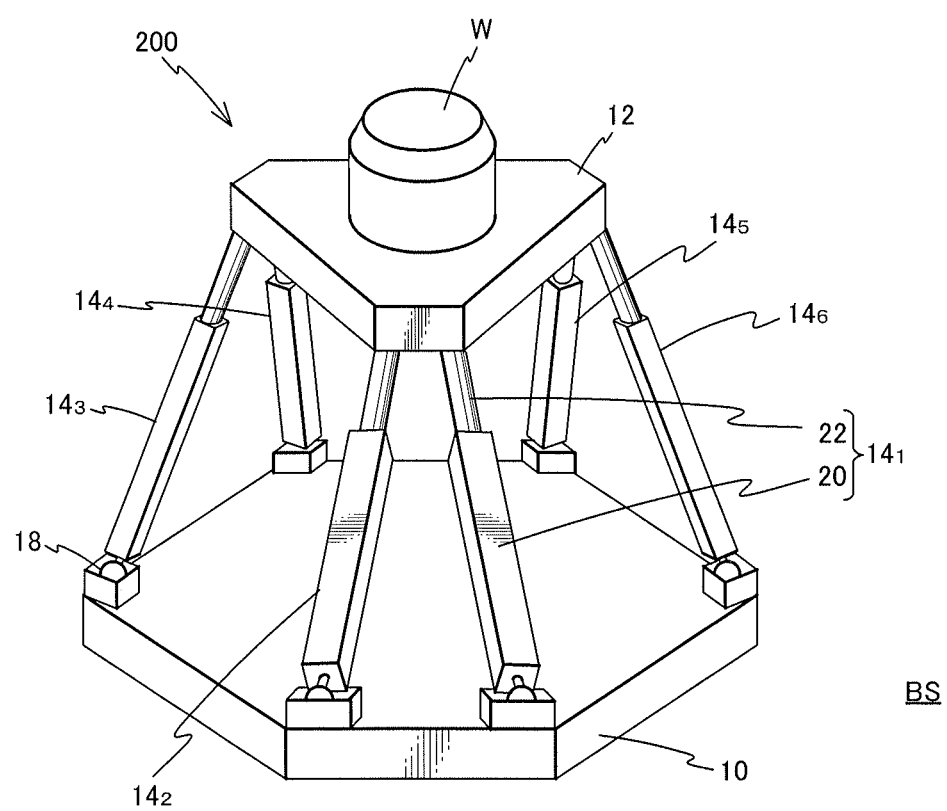
FIG. 3 is a perspective view showing the movement system on which a workpiece is mounted.

FIG. 2 schematically shows a structure of movement system 200, along with that of measurement system 400. Further, FIG. 3 shows movement system 200 on which a workpiece W is mounted in a perspective view. In the description below, the lateral direction of the page surface in FIG. 2 will be described as a Y-axis direction, a direction orthogonal to the page surface will be described as the X-axis direction, a direction orthogonal to the X-axis and the Y-axis will be described as a Z-axis direction, and rotation (tilt) directions around the X-axis, the Y-axis, and the Z-axis will be described as θx, θy, and θz directions, respectively.

Movement system 200 changes position and attitude of a target surface (in this case, a surface on workpiece W on which a target portion TA is set) TAS (for example, refer to FIGS. 4 and 9A) for shaping. Specifically, by driving the workpiece having the target surface and the table to be described later on where the workpiece is mounted in directions of six degrees of freedom (6-DOF) (in each of the X-axis, the Y-axis, the Z-axis, the θx, the θy, and the θz directions), position in directions of 6-DOF of the target surface is changed. In this description, as for the table, the workpiece, the target surface and the like, position in directions of three degrees of freedom (3-DOF) in the θx, the θy, and the θz directions will be referred to collectively as "attitude", and corresponding to this, the remaining directions of three degrees of freedom (3-DOF) in the X-axis, the Y-axis, and the Z-axis directions will be referred to collectively as "position".

As an example of a drive mechanism for changing the position and attitude of the table, movement system 200 is equipped with a Stewart platform type 6-DOF parallel link mechanism. Movement system 200 is not limited to a system that can drive the table in directions of 6-DOF.

Movement system 200 (excluding a stator of a planar motor to be described later on) is placed on a base BS installed on a floor F so that its upper surface is almost parallel to an XY plane, as shown in FIG. 2. Movement system 200 has a slider 10 having a regular hexagonal shape in a planar view that structures a base platform, table 12 that structures an end effector, six expandable rods (links) $14_1$ to $14_6$ for connecting slider 10 and table 12, and expansion mechanisms $16_1$ to $16_6$ (not shown in FIG. 3, refer to FIG. 11) provided in each rod to make each rod expand and contract, as shown in FIG. 3. Movement system 200 employs a structure so that the movement of table 12 can be controlled in 6-DOF within a three-dimensional space by separately adjusting the length of rods $14_1$ to $14_6$ with expansion mechanisms $16_1$ to $16_6$. Movement system 200 is provided with features such as high accuracy, high rigidity, large supporting force, and easy inverse kinematic calculation, since the system is equipped with a Stewart platform type E-DOF parallel link mechanism as a drive mechanism of table 12.

In shaping apparatus shaping 100 according to the embodiment, position and attitude of the workpiece (table 12) are controlled with respect to beam shaping system 500, or more specifically, a beam from a beam irradiation section to be described later on so that a shaping object of a desired shape is formed of the workpiece at times such as additive manufacturing to the workpiece. In principle, contrary to this, the beam from the beam irradiation section may be movable or the beam and the workpiece (table) may both be movable. As it will be described later on, because beam shaping system 500 has a complex structure, it is easier to move the workpiece instead.

Table 12 here consists of a plate member having a shape of an equilateral triangle with each apex cut off. Workpiece W subject to additive manufacturing is mounted on the upper surface of table 12. A chuck mechanism 13 (not shown in FIG. 3, refer to FIG. 11) for fixing workpiece W is provided at table 12. As chuck mechanism 13, for example, a mechanical chuck or a vacuum chuck is used. Note that the shape of table 12 is not limited to the shape shown in FIG. 3, and may be any shape such as a rectangular plate shape or a disk shape.

In this case, as is obvious from FIG. 3, rods $14_1$ to $14_6$ are each connected to slider 10 and table 12 via universal joints 18 at both ends of the rods. Rods $14_1$ and $14_2$ are connected near one apex position of the triangle of table 12, and are placed so that slider 10 and these rods $14_1$ and $14_2$ structure a roughly triangular shape. Similarly, rods $14_3$ and $14_4$ and rods $14_5$ and $14_6$ are connected, respectively, near each of the remaining apex positions of the triangle of table 12, and are placed so that slider 10 and rods $14_3$ and $14_4$, and slider 10 and rods $14_5$ and $14_6$ each structure a roughly triangular shape.

These rods $14_1$ to $14_2$ each have a first shaft member 20 and a second shaft member 22 relatively movable in each axial direction as in rod $14_1$ representatively shown in FIG. 3, and one end (lower end) of the first shaft member 20 is attached to slider 10 via universal joint 18 and the other end (upper end) of the second shaft member 22 is attached to table 12 via a universal joint.

Inside the first shaft member 20, a stepped columnar hollow portion is formed, and in the lower end side of the hollow portion, for example, a bellows type air cylinder is housed. To this air cylinder, a pneumatic circuit and an air pressure source (none of which are shown) are connected. By controlling pneumatic pressure of compressed air supplied from the air pressure source via the pneumatic circuit, internal pressure of the air cylinder is controlled, which makes a piston that the air cylinder has move reciprocally in the axial direction. The air cylinder, in the returning process, is made to use gravitational force that acts on the piston when incorporated in the parallel link mechanism.

At the upper end side inside the hollow portion of the first shaft member 20, an armature unit (not shown) is placed consisting of a plurality of armature coils placed lined in the axial direction.

Meanwhile, one end (lower end) of the second shaft member 22 is inserted into the hollow portion of the first shaft member 20. At the one end of the second shaft member 22, a small diameter section having a diameter smaller than other sections is formed, and a tubular mover yoke consisting of a magnetic member is provided around this small diameter section. At the outer periphery of the mover yoke, a hollow columnar magnet body consisting of a plurality of permanent magnets of the same size, that is, a cylindrical magnet body is provided. In this case, the mover yoke and the magnet body structure a hollow columnar magnet unit. In the embodiment, the armature unit and the magnet unit structure a shaft motor which is a type of electromagnetic linear motor. In the shaft motor structured in the manner described above, by supplying a sinusoidal drive current of a predetermined period and a predetermined amplitude to each coil of the armature unit serving as a stator, Lorentz force (drive force) is generated by an electromagnetic interaction which is a type of electromagnetic reciprocal action between the magnet unit and the armature unit, which is used to relatively drive the second shaft member 22 in the axial direction with respect to the first shaft member 20.

That is to say, in the embodiment, the air cylinder described above and the shaft motor structure expansion mechanisms $16_1$ to $16_6$ (refer to FIG. 11) previously described that make rods $14_1$ to $14_6$ expand and contract by relatively moving the first shaft member 20 and the second shaft member 22 in the axial direction.

The magnet unit serving as the mover of the shaft motor is supported in a non-contact manner with respect to the armature unit serving as the stator, via an air pad provided on the inner circumferential surface of the first shaft member 20.

Figure 11:
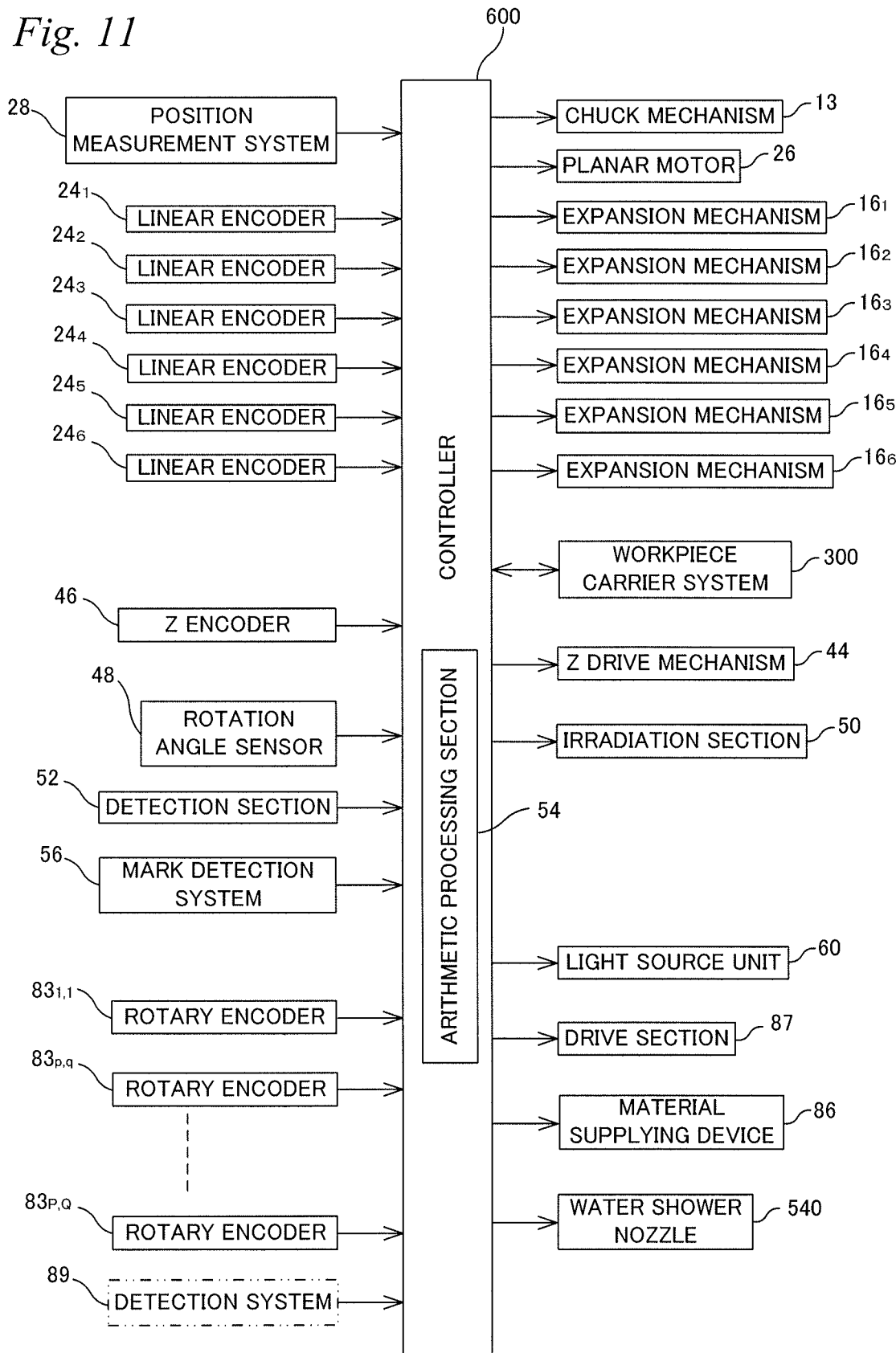
FIG. 11 is a block diagram showing an input/output relation of a controller that mainly structures a control system of the shaping apparatus.

Although illustration is omitted in FIG. 3, rods $14_1$ to $14_6$ each have absolute linear encoders $24_1$ to $24_6$ provided for detecting the position of the second shaft member 22 in the axial direction with the first shaft member 20 as a reference, and the output of these linear encoders $24_1$ to $24_6$ is to be supplied to controller 600 (refer to FIG. 11). The position of the second shaft member 22 in the axial direction detected by linear encoders $24_1$ to $24_6$ correspond to the respective length of rods $14_1$ to $14_6$.

On the basis of the output of linear encoders $24_1$ to $24_6$, controller 600 controls expansion mechanisms $16_1$ to $16_6$ (refer to FIG. 11). Details on the structure of the parallel link mechanism similar to movement system 200 of the embodiment are disclosed in, for example, U.S. Pat. No. 6,940,582, and controller 600 controls the position and the attitude of table 12 according to a method similar to the one disclosed in the above U.S. patent using inverse kinematic calculation via expansion mechanisms $16_1$ to $16_6$.

In movement system 200, because expansion mechanisms $16_1$ to $16_6$ provided at each of rods $14_1$ to $14_6$ have the air cylinder and the shaft motor which is a kind of electromagnetic linear motor placed in series (or parallel) to one another, controller 600 moves table 12 roughly and greatly by pneumatic control of the air cylinder as well as in a fine manner by the shaft motor. As a consequence, this allows the position in directions of 6-DOF (i.e., position and attitude) of table 12 to be controlled within a short time accurately.

Rods $14_1$ to $14_6$ each have an air pad for supporting the magnet unit serving as the mover of the shaft motor in a noncontact manner with respect to the armature unit serving as the stator, therefore, friction which becomes a nonlinear component when controlling the expansion/contraction of the rods with the expansion mechanisms can be avoided, which allows more highly precise control of position and attitude of table 12.

In the embodiment, because the shaft motor is used as the electromagnetic linear motor structuring expansion mechanisms $16_1$ to $16_6$ and the magnet unit using the cylindrical magnet is used in the mover side of the shaft motor, this generates magnetic flux (magnetic field) in all directions of radiation direction of the magnet and the magnetic flux in all directions can be made to contribute to generating the Lorentz force (drive force) by electromagnetic interaction, which allows thrust obviously larger when comparing to, for example, a normal linear motor or the like to be generated and allows easier downsizing when compared to a hydraulic cylinder or the like.

Consequently, according to movement system 200 with rods each including the shaft motor, downsizing, lighter weight and improving output can be achieved at the same time, and this can be suitably applied to shaping apparatus 100.

In controller 600, low frequency vibration can be controlled by controlling air pressure of the air cylinder that structure each of the expansion mechanisms and high frequency vibration can be isolated by current control to the shaft motor.

Movement system 200 is further equipped with a planar motor 26 (refer to FIG. 11). At the bottom surface of slider 10, a mover of planar motor 26 consisting of a magnet unit (or a coil unit) is provided, and corresponding to this, a stator of planar motor 26 consisting of a coil unit (or a magnet unit) is housed inside base BS. At the bottom surface of slider 10, a plurality of air bearings (air hydrostatic bearings) are provided surrounding the mover, and by the plurality of air bearings, slider 10 is supported by levitation via a predetermined clearance (gap or space) on the upper surface (guide surface) of base BS finished to have high degree of flatness. Slider 10, by the electromagnetic force (Lorentz force) generated by the electromagnetic interaction between the stator and mover of planar motor 26, is driven within the XY plane in a noncontact manner with respect to the upper surface of base BS. In the embodiment, movement system 200, as shown in FIG. 1, can freely move table 12 between the placement positions of measurement system 400, beam shaping system 500, and a workpiece carrier system 300 (not shown in FIG. 1, refer to FIG. 11). Note that movement system 200 may be equipped with a plurality of tables 12 on which workpiece W is mounted separately. For example, while processing using beam shaping system 500 is being performed on the workpiece held by one table of the plurality of tables, measurement using measurement system 400 may be performed on the workpiece held by another table. Even in such a case, each table can be freely moved between the placement positions of measurement system 400, beam shaping system 500, and workpiece carrier system 300 (not shown in FIG. 1, refer to FIG. 11). Or, in the case a structure is employed where a table for holding the workpiece when performing measurement exclusively using measurement system 400 and a table for holding the workpiece when performing processing exclusively using beam shaping system 500 are provided and the workpiece may be loaded and unloaded on/from the two tables with a workpiece carrier system or the like, each slider 10 may be fixed on base BS. In the case of providing a plurality of tables 12, each table 12 can be moved in directions of 6-DOF, and the position in directions of 6-DOF of each table 12 can be controlled.

Planar motor 26 is not limited to the motor that employs the air levitation method, and a planar motor employing a magnetic levitation method may also be used. In the latter case, the air bearings do not have to be provided in slider 10. As planar motor 26, both motors of a moving-magnet type and a moving-coil type can be used.

Controller 600 can, by controlling at least one of the amount and the direction of electric current supplied to each coil of the coil unit structuring planar motor 26, drive slider 10 freely in the X and Y two-dimensional directions on base BS.

In the embodiment, movement system 200 is equipped with a position measurement system 28 (refer to FIG. 11) that measures position information of slider 10 in the X-axis direction and the Y-axis direction. As position measurement system 28, a two-dimensional absolute encoder can be used.

Specifically, on the upper surface of base BS, a two-dimensional scale is provided that has a strip shaped absolute code of a predetermined width covering the whole length in the X-axis direction, and correspondingly on the bottom surface of slider 10, a light source such as a light emitting element is provided as well as an X head and a Y head that are structured by a one-dimensional light receiving element array arranged in the X-axis direction and a one-dimensional light receiving element array arranged in the Y-axis direction that respectively receive reflection light from the two-dimensional scale illuminated by the light beam emitted from the light source. As the two-dimensional scale, for example, a scale is used that has a plurality of square reflective portions (marks) arranged two-dimensionally at a predetermined period on a non-reflective base material (having a reflectance of 0%) along two directions orthogonal to each other (the X-axis direction and the Y-axis), and whose reflection characteristics (reflectance) of the reflective portions have gradation that follow predetermined rules. As the two-dimensional absolute encoder, a structure similar to the two-dimensional absolute encoder disclosed in, for example, U.S. Patent Application Publication No. 2014/0070073 may be employed. According to the absolute two-dimensional encoder having a structure similar to that of U.S. Patent Application Publication No. 2014/0070073, the encoder allows measurement of two-dimensional position information with high precision which is around the same level as the conventional incremental encoder. Because the encoder is an absolute encoder, origin detection is not necessary unlike the incremental encoder. Measurement information of position measurement system 28 is sent to controller 600.

In the embodiment, as it will be described later on, position information (shape information in the embodiment) within the three-dimensional space of at least a part of the target surface (e.g. the upper surface) of workpiece W mounted on table 12 is measured using measurement system 400, and then additive manufacturing (shaping) is performed on workpiece W after the measurement. Accordingly, controller 600, when measuring position information within the three-dimensional space of at least a part of the target surface on workpiece W, correlates the measurement results, measurement results of linear encoders $24_1$ to $24_6$ provided at rods $14_1$ to $14_6$ at the time of measurement, and measurement results of position measurement system 28, so that the position and attitude of the target surface of workpiece W mounted on table 12 can be correlated with a reference coordinate system (hereinafter called a table coordinate system) of shaping apparatus 100. This allows position control in directions of 6-DOF with respect to a target value of target surface TAS on workpiece W thereinafter according to open loop control on the position of table 12 in directions of 6-DOF based on the measurement results of linear encoders $24_1$ to $24_6$ and position measurement system 28. In the embodiment, since absolute encoders are used as linear encoders $24_1$ to $24_F$ and position measurement system 28, origin search is not required which makes reset easy. Note that the position information within the three-dimensional space to be measured with measurement system 400 used for making position control in directions of 6-DOF with respect to the target value of target surface TAS on workpiece W according to open loop control on the position of table 12 in directions of 6-DOF is not limited to shape, and is sufficient if the information is three-dimensional position information of at least three points corresponding to the shape of the target surface.

In the above embodiment, while the case has been described of using planar motor 26 as a drive device for driving slider 10 within the XY plane, a linear motor may also be used instead of planar motor 26. In this case, instead of the two-dimensional absolute encoder previously described, the position measurement system that measures position information of slider 10 may be structured using the absolute linear encoder. The position measurement system that measures position information of slider 10 is not limited to the encoders and may also be structured by using an interferometer system.

In the above embodiment, while an example was given of the case when the mechanism for driving the table is structured using the planar motor which drives the slider within the XY plane and the Stewart platform type 6-DOF parallel link mechanism in which the slider structures the base platform, the mechanism is not limited to this, and the mechanism for driving the table may also be structured by other types of parallel link mechanisms, or a mechanism other than the parallel link mechanism. For example, a slider that moves in the XY plane and a Z-tilt drive mechanism that drives table 12 in the Z-axis direction and an inclination direction with respect to the XY plane on the slider may be employed. As an example of such Z-tilt drive mechanism, a mechanism can be given that supports table 12 at each apex position of the triangle from below, via joints such as, e.g. universal joints, and also has three actuators (such as voice coil motors) that can move each supporting point independently from one another in the Z-axis direction. However, the structure of the mechanism for driving the table in movement system 200 is not limited to these structures, and the mechanism only has to have the structure of being able to drive the table (movable member) on which the workpiece is mounted in directions of at least 5-DOF that are directions of 3-DOF within the XY plane, the Z-axis direction, and the inclination direction with respect to the XY plane, does not necessarily have to be equipped with a slider that moves within the XY plane. For example, the movement system can be structured with a table and a robot that drives the table. In any structure, reset can be performed easily when the measurement system for measuring the position of the table is structured using a combination of the absolute linear encoder, or a combination of the linear encoder and an absolute rotary encoder.

Other than this, instead of movement system 200, a system that can drive table 12 in directions of at least 5-DOF, which are directions of 3-DOF within the XY plane, the Z-axis direction, and the inclination direction (θx or θy) with respect to the XY plane may be employed. In this case, table 12 in itself may be supported by levitation (supported in a non-contact manner) via a predetermined clearance (gap or space) on the upper surface of a support member such as base BS, by air floatation or magnetic levitation. When such structure is employed, since the table moves in a noncontact manner with respect to the supporting member, this is extremely advantageous in positioning accuracy and contributes greatly to improving shaping accuracy.

Measurement system 400 performs measurement of the three-dimensional position information of the workpiece, e.g. measurement of shape, to correlate the position and the attitude of the workpiece mounted on table 12 to the table coordinate system. Measurement system 400 is equipped with a laser noncontact type three-dimensional measuring machine 401, as shown in FIG. 2. Three-dimensional measuring machine 401 is equipped with a frame 30 installed on base BS, a head section 32 attached to frame 30, a Z-axis guide 34 mounted on head section 32, a rotating mechanism 36 provided at the lower end of Z-axis guide 34, and a sensor section 38 connected to the lower end of rotating mechanism 36.

Frame 30 consists of a horizontal member 40 extending in the Y-axis direction and a pair of column members 42 supporting horizontal member 40 from below at both ends of the Y-axis direction.

Head section 32 is attached to horizontal member 40 of frame 30.

Z-axis guide 34 is attached movable in the Z-axis direction to head section 32 and is driven in the Z-axis direction by a Z drive mechanism 44 (not shown in FIG. 2, refer to FIG. 11). Position in the Z-axis direction (or displacement from a reference position) of Z-axis guide 34 is measured by a Z encoder 46 (not shown in FIG. 2, refer to FIG. 11).

Rotating mechanism 36 rotationally drives sensor section 38 continuously (or in steps of a predetermined angle) around a rotation center axis parallel to the Z-axis within a predetermined angle range (e.g. within a range of 90 degrees ($\pi/2$) or 180 degrees ($\pi$)) with respect to head section 32 (Z-axis guide 34). In the embodiment, the rotation center axis of sensor section 38 according to rotating mechanism 36 coincides with a center axis of a line beam irradiated from an irradiation section to be described later on that structures sensor section 38. Rotation angle (or position of the sensor section in the θz direction) from a reference position of sensor section 38 according to rotating mechanism 36 is measured by a rotation angle sensor 48 (not shown in FIG. 2, refer to FIG. 11) such as, for example, a rotary encoder.

Sensor section 36 is structured mainly of an irradiation section 50 that irradiates a line beam for performing optical cutting on a test object (workpiece W in FIG. 2) mounted on table 12, and a detection section 52 that detects the surface of the test object in which an optical cutting surface (line) appears by being irradiated by the line beam. Sensor section 38 also has an arithmetic processing section 54 connected that acquires the shape of the test object on the basis of image data detected by detection section 52. Arithmetic processing section 54 in the embodiment is included in controller 600 (refer to FIG. 11) that has overall control over each part structuring shaping apparatus 100.

Irradiation section 50 is structured of parts such as a cylindrical lens (not shown) and a slit plate having a thin strip-shaped cutout, and generates a fan-shaped line beam 50*a* by receiving illumination light from a light source. As the light source, LED, laser light source, SLD (super luminescent diode) or the like can be used. In the case of using the LED, the light source can be formed at a low cost. In the case of using the laser light source, a line beam with low aberration can be formed since the light source is a point light source, and since wavelength stability is superior and half bandwidth small, a filter of a small bandwidth can be used to cut stray light, which can reduce the influence of disturbance. In the case of using the SLD, in addition to the properties of the laser light source, since coherence of the SLD is lower than that of the laser, speckle generation at the test object surface can be suppressed. Detection section 52 is used for imaging line beam 50*a* projected on the surface of the test object (workpiece W) from a direction different from the light irradiation direction of irradiation section 50.

Detection section 52 is structured with parts (not shown) such as an imaging lens and a CCD, and as it is described later on, images the test object (workpiece W) each time table 12 is moved and line beam 50*a* is scanned at a predetermined interval. Positions of irradiation section 50 and detection section 52 are decided so that an incident direction to detection section 52 of line beam 50*a* on the surface of the test object (workpiece W) and a light irradiation direction of irradiation section 50 form a predetermined angle θ. In the embodiment, the above predetermined angle θ is set to, e.g. 45 degrees.

The image data of the test object (workpiece W) imaged by detection section 52 is sent to arithmetic processing section 54 where a predetermined arithmetic processing is performed to calculate the surface height of the test object (workpiece W) so that a three-dimensional shape (surface shape) of the test object (workpiece W) can be acquired. Arithmetic processing section 54, in the image of the test object (workpiece W), calculates the height of the test object (workpiece W) surface from a reference plane using a principle of triangulation for each pixel in the longitudinal direction in which the optical cutting surface (line) (line beam 50*a*) extends and performs arithmetic processing to acquire the three-dimensional shape of the test object (workpiece W), on the basis of position information of optical cutting surface (line) by line beam 50*a* deformed according to the unevenness of the test object (workpiece W).

In the embodiment, controller 600 moves table 12 in a direction substantially orthogonal to the longitudinal direction of line beam 50*a* projected on the test object (workpiece W) so that line beam 50*a* scans the surface of test object (workpiece W). Controller 600 detects rotation angle of sensor section 38 with rotation angle sensor 48, and moves table 12 in the direction substantially orthogonal to the longitudinal direction of line beam 50*a* based on the detection results. As described, in the embodiment, since table 12 is moved on measurement of the shape or the like of the test object (workpiece W), as a premise, the position and the attitude of table 12 (position in directions of 6-DOF) are constantly set to a predetermined reference state at the point when table 12 enters an area under sensor section 38 of measurement system 400 holding workpiece W. The reference state is a state in which, e.g. rods $14_1$ to $14_6$ are all at a length corresponding to a neutral point (or a minimum length) of an expansion/contraction stroke range, and at this time, the position in each of the Z-axis, the θx, the θy and the θz directions of table 12 is (Z, θx, θy, θz)=($Z_0$, 0, 0, 0). In this reference state, position (X, Y) within the XY plane of table 12 coincides with the X and the Y positions of slider 10 measured with position measurement system 28.

Then, the measurement described above to the test object (workpiece W) begins, and the position in directions of 6-DOF of table 12 is controlled by controller 600 on the table coordinate system, also during the measurement. That is, controller 600 controls the position in directions of 6-DOF of table 12 by controlling planar motor 26 based on the measurement information of position measurement system 28 and by controlling expansion mechanisms $16_1$ to $16_6$ based on the measurement values of linear encoders $24_1$ to $24_6$.

In the case of using the optical cutting method as in three-dimensional measuring machine 401 according to the present embodiment, line beam 50*a* irradiated on the test object (workpiece W) from irradiation section 50 of sensor section 38 is preferably arranged in a direction orthogonal to a relative movement direction between sensor section 38 and table 12 (test object (workpiece W)). For example, in FIG. 2, when the Y-axis direction is set as the relative movement direction between sensor section 38 and table 12 (test object (workpiece W)), line beam 50*a* is preferably arranged along the X-axis direction. This arrangement allows relative movement to the test object (workpiece W) while effectively using the whole area of line beam 50*a* at the time of measurement, and the shape of the test object (workpiece W) can be measured optimally. Rotating mechanism 36 is provided so that the direction of line beam 50*a* and the relative movement direction described above can be orthogonal constantly.

Three-dimensional measuring machine 401 described above is structured similarly to the shape measurement apparatus disclosed in, for example, U.S. Patent Application Publication No. 2012/0105667. However, while scanning of the line beam with respect to the test object in directions parallel to the X, Y planes is performed by movement of the sensor section in the apparatus described in U.S. Patent Application Publication No. 2012/0105867, the embodiment differs on the point that the scanning is performed by moving table 12. In the embodiment, scanning of the line beam with respect to the test object in a direction parallel to the Z-axis may be performed by driving either Z-axis guide 34 or table 12.

In the measurement method of using three-dimensional measuring machine 401 according to the present embodiment, by using the optical cutting method, a linear projection pattern consisting of a line beam is projected on the surface of the test object, and each time the linear projection pattern is scanned with respect to the whole surface of the test object surface, the linear projection pattern projected on the test object is imaged from an angle different from the projection direction. Then, from the captured image of the test object surface that was imaged, the height of the test object surface from the reference plane is calculated using the principle of triangulation for each pixel in the longitudinal direction of the linear projection pattern, and the three-dimensional shape of the test object surface is acquired.

Other than this, as the three-dimensional measuring machine that structures measurement system 400, a device having a structure similar to an optical probe disclosed in, for example, U.S. Pat. No. 7,009,717 can also be used. This optical probe is structured by two or more optical groups, and includes two or more visual field directions and two or more projection directions. One optical group includes one or more visual field direction and one or more projection direction, and at least one visual field direction and at least one projection direction differ between the optical groups, and data acquired from the visual field direction is generated only from a pattern projected from the projection direction in the same optical group.

Measurement system 400 may be equipped with a mark detection system 56 (refer to FIG. 11) for optically detecting an alignment mark instead of the three-dimensional measuring machine 401, above, or in addition to the three-dimensional measuring machine described above. Mark detection system 56 can detect an alignment mark formed, for example, on the workpiece. Controller 600, by accurately detecting each center position (three-dimensional coordinate) of at least three alignment marks using mark detection system 56, calculates the position and attitude of the workpiece (or table 12). Such mark detection system 56 can be structured including, e.g. a stereo camera. A structure may also be employed in which mark detection system 56 optically detects alignment marks arranged beforehand at a minimum of three places on table 12.

In the embodiment, controller 600 scans the surface (target surface) of workpiece W and acquires the surface shape data, using the three-dimensional measuring machine 401 in the manner described above. Then, controller 600 performs least-square processing and performs correlation of the three-dimensional position and attitude of the target surface on the workpiece to the table coordinate system using the surface shape data. Here, because the position of table 12 in directions of 6-DOF is controlled on the table coordinate system by controller 600 also during the time of measurement to the test object (workpiece W) described above, control of the position (that is, position and attitude) of workpiece W in directions of 6-DOF including the time of additive manufacturing by three-dimensional shaping can all be performed by an open-loop control of table 12 according to the table coordinate system, after the three-dimensional position and attitude have been correlated to the table coordinate system.

Figure 4:
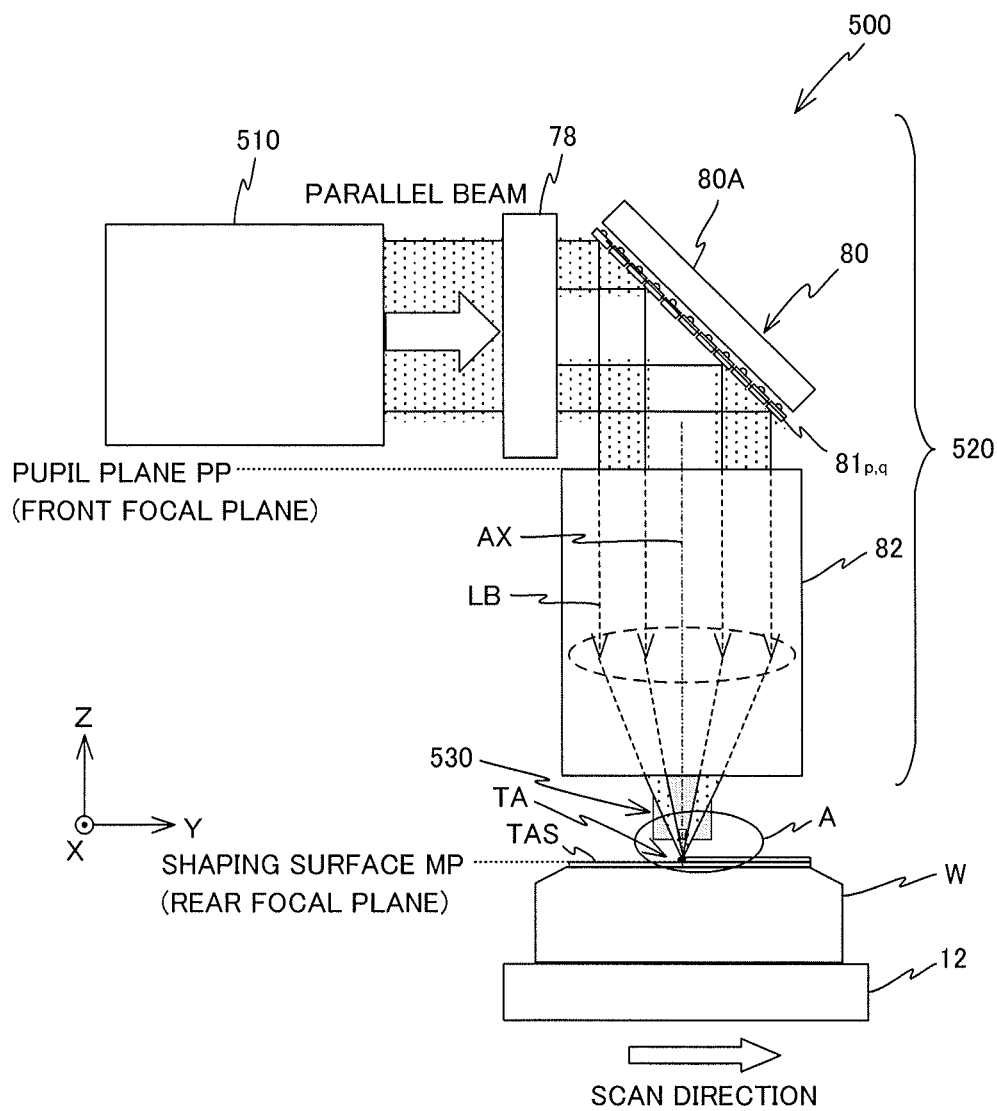
FIG. 4 is a view showing a beam shaping system along with a table on which the workpiece is mounted.

FIG. 4 shows beam shaping system 500, along with table 12 on which workpiece W is mounted. As shown in FIG. 4, beam shaping system 500 includes a light source system 510, and is equipped with a beam irradiation section 520 that emits a beam, a material processing section 530 that supplies a powdery shaping material, and a water shower nozzle 540 (not shown in FIG. 4, refer to FIG. 11). Note that beam shaping system 500 does not have to be equipped with water shower nozzle 540.

Figure 5:
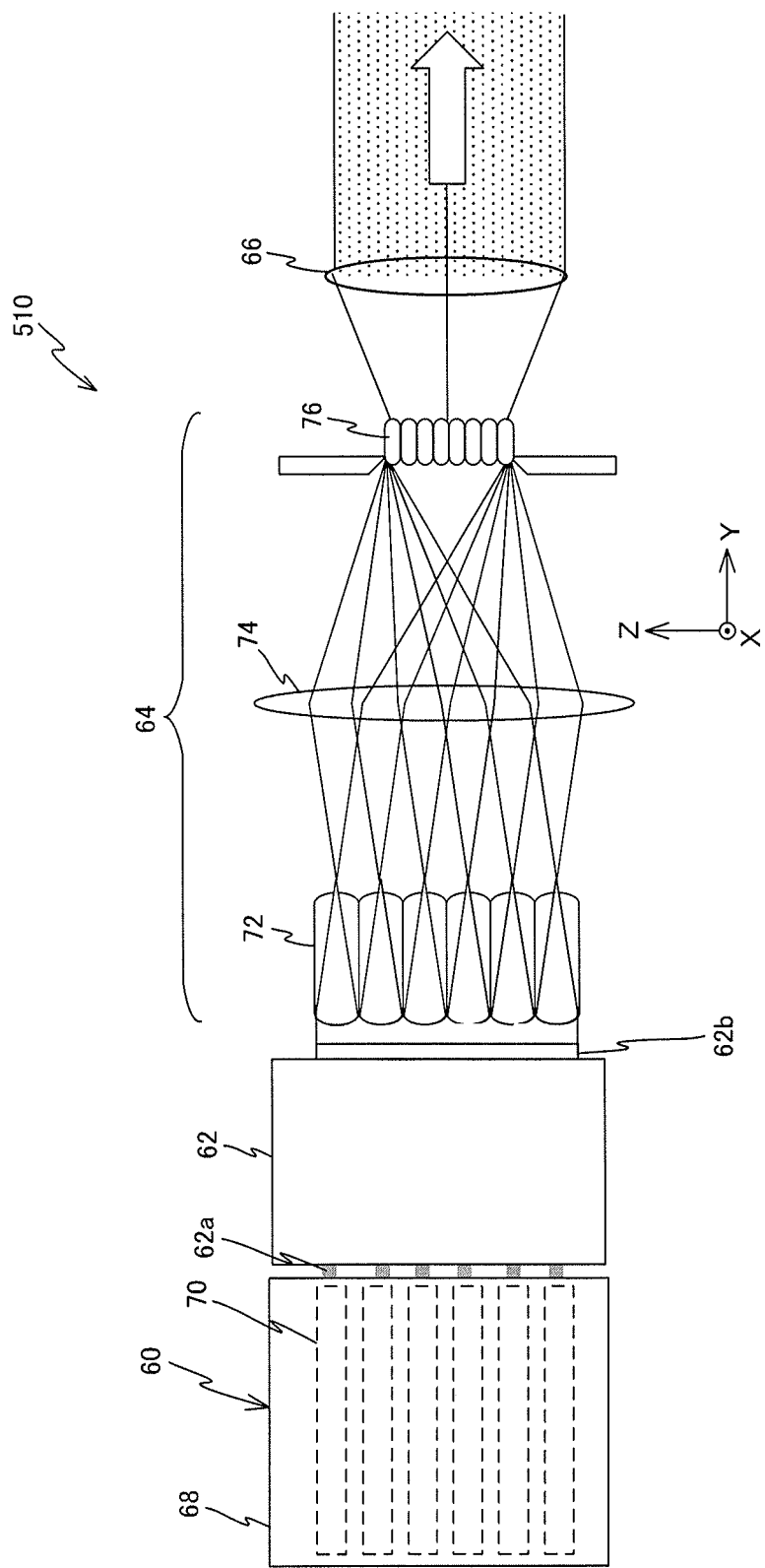
FIG. 5 is a view showing an example of a structure of a light source system structuring a part of a beam irradiation section that the beam shaping system has.

Light source system 510, as is shown in FIG. 5, is equipped with a light source unit 60, a light guide fiber 62 connected to light source unit 60, and a double fly-eye optical system 64 and a condenser lens system 66 placed on the exit side of light guide fiber 62.

Light source unit 60 has a housing 68, and a plurality of laser units 70 which are housed inside housing 68 and are arranged parallel to one another in the shape of a matrix. As laser unit 70, a unit that serves as a light source can be used such as various types of lasers that perform pulse oscillation or continuous wave oscillating operation, an Nd:YAG laser, a fiber laser, or a GaN-based semiconductor laser.

Light guide fiber 62 is a fiber bundle structured by randomly bundling many optical fiber strands that has a plurality of incident ports 62a connected individually to the light-emitting end of the plurality of laser units 70 and a light-emitting section 62b that has more light-emitting ports than the number of incident ports 62a. Light guide fiber 62 receives a plurality of laser beams (hereinafter appropriately shortened to as a "beam")) emitted from each of the plurality of laser units 70 via each incident port 62a and distributes the beam to the plurality of light-emitting ports so that at least a part of each laser beam is emitted from a common light-emitting port. In this manner, light guide fiber 62 mixes and emits the beams emitted from each of the plurality of laser units 70. This allows the total output to be increased according to the number of laser unit 70s when compared to the case when a single laser unit is used. However, the plurality of laser units do not have to be used in the case the output acquired is enough using a single laser unit.

Light-emitting section 62b here has a sectional shape similar to a whole shape of an incident end of a first fly-eye lens system that structures an incident end of double fly-eye optical system 64 which will be described next, and the light-emitting ports are provided in an approximately even arrangement within the section. Therefore, light guide fiber 62 also serves as a shaping optical system that shapes the beam mixed in the manner described above so that the beam is shaped similar to the whole shape of the incident end of the first fly-eye lens system.

Double fly-eye optical system 64 is a system for making a uniform cross-sectional illuminance distribution (sectional intensity distribution) of the beam (illumination light), and is structured with a first fly-eye lens system 72, a lens system 74, and a second fly-eye lens system 76 arranged sequentially on a beam path (optical path) of the laser beam behind light guide fiber 62. Note that a diaphragm is provided in the periphery of the second fly-eye lens system 75.

In this case, an incidence plane of the first fly-eye lens system 72 and an incidence plane of the second fly-eye lens system 76 are set optically conjugate to each other. A focal plane (a surface light source to be described later is formed here) on the exit side of the first fly-eye lens system 72, a focal plane (a surface light source to be described later is formed here) on the exit side of the second fly-eye lens system 76, and a pupil plane (entrance pupil) PP of a condensing optical system 82 (to be described later on) are set optically conjugate to one another. Note that in the embodiment, a pupil plane (entrance pupil) PP of a condensing optical system 82 coincides with a focal plane on the front side (refer to FIGS. such as, for example, 4, 6 and 7).

The beam mixed by light guide fiber 62 is incident on the first fly-eye lens system 72 of double fly-eye optical system 64. With this, a surface light source, i.e. secondary light source consisting of many light source images (point light sources), is formed on a focal plane on the exit side of the first fly-eye lens system 72. The laser beams from each of the many point light sources are incident on the second fly-eye lens system 76 via lens system 74. With this, a surface light source (a tertiary light source) in which many fine light source images distributed in a uniform manner within an area of a predetermined shape are formed on a focal plane on the exit side of the second fly-eye lens system 76.

Condenser lens system 66 emits the laser beam emitted from the tertiary light source described above as a beam that has uniform illuminance distribution.

Note that by performing optimization on the area of the incident end of the second fly-eye lens system 76, the focal distance of condenser lens system 66 and the like, the beam emitted from condenser lens system 66 can be regarded as a parallel beam.

Light source 510 of the embodiment is equipped with an illuminance uniformizing optical system that is equipped with light guide fiber 62, double fly-eye optical system 64, and condenser lens system 66, and using this illuminance uniformizing optical system, mixes the beams emitted from each of the plurality of laser units 70 and generates a parallel beam having a cross-section with uniform illuminance distribution.

Note that the illuminance uniformizing optical system is not limited to the structure described above. For example, the illuminance uniformizing optical system may be structured using a rod integrator or a collimator lens system.

Light source unit 60 of light source system 510 is connected to controller 600, and controller 600 individually controls the on/off of the plurality of laser units 70 structuring light source unit 60. With this control, the amount of light of the laser beam (laser output) irradiated (on the target surface) on workpiece W from beam irradiation section 520 is adjusted.

Note that shaping apparatus 100 does not have to be equipped with light source unit 60, or light source unit and the illuminance uniformizing optical system. For example, a parallel beam having a desired light amount (energy) and desired illuminance uniformity may be supplied to shaping apparatus 100 from an external device.

Beam irradiation section 520, other than light source system 510, has a beam section intensity conversion optical system 78, a mirror array 80 which is a type of spatial light modulator (SLM: Spatial Light Modulator), and a condensing optical system 82 which condenses the light from mirror array 80 that are sequentially arranged on the optical path of the parallel beam from light source system 510 (condenser lens system 66), as shown in FIG. 4. The spatial light modulator here is a general term for an element that spatially modulates the amplitude (intensity), phase, or state of polarization of light advancing in a predetermined direction.

Beam section intensity conversion optical system 78 performs conversion of the intensity distribution of the cross sectional surface of the parallel beam from light source system 510 (condenser lens system 66). In the embodiment, beam section intensity conversion optical system 78 converts the parallel beam from light source system 510 into a parallel beam having a donut shape (annular shape) with the intensity of an area including the center of the cross sectional surface being substantially zero. Beam section intensity conversion optical system 78, in the embodiment, is structured, for example, with a convex conically shaped reflection mirror and a concave conically shaped reflection mirror that are sequentially placed on the optical path of the parallel beam from light source system 510. The convex conically shaped reflection mirror has a conically shaped reflection surface formed on its outer peripheral surface on the light source system 510 side, and the concave conically shaped reflection mirror, consisting of an annular-shaped member having an inner diameter larger than the outer diameter of the convex conically shaped reflection mirror, has a reflection surface facing the reflection surface of the convex conically shaped reflection mirror formed on its inner peripheral surface. In this case, when viewing from an arbitrary sectional surface that passes through the center of the concave conically shaped reflection mirror, the reflection surface of the convex conically shaped reflection mirror and the reflection surface of the concave conically shaped reflection mirror are parallel.

Consequently, the parallel beam from light source system 510 is reflected radially by the reflection surface of the convex conically shaped reflection mirror, and by this reflection beam being reflected by the reflection surface of the concave conically shaped reflection mirror, the beam is converted into the annular shaped parallel beam.

In the embodiment, the parallel beam that passes through beam section intensity conversion optical system 78 is irradiated on the workpiece, via mirror array 80 and condensing optical system 82 in the manner to be described later on. By converting the intensity distribution of the cross sectional surface of the parallel beam from light source system 510 using beam section intensity conversion optical system 78, it becomes possible to change intensity distribution of the beam incident on pupil plane (entrance pupil) of condensing optical system 82 from mirror array 80. In addition, by converting the intensity distribution of the cross sectional surface of the parallel beam from light source system 510 using beam section intensity conversion optical system 78, it becomes possible to substantially change intensity distribution in the exit plane of condensing optical system 82 of the beam emitted from condensing optical system 82.

Note that beam section intensity conversion optical system 78 is not limited to the combination of the convex conically shaped reflection mirror and the concave conically shaped reflection mirror, and may be structured using a combination of a diffractive optical element, an afocal lens, and a conical axicon system as is disclosed in, for example, U.S. Patent Application Publication No. 2008/0030852. Beam section intensity conversion optical system 78 is sufficient if it performs conversion of the intensity distribution of the cross sectional surface of the beam, and various structures can be considered. Depending on the structure of beam section intensity conversion optical system 78, it is possible to make the parallel beam from light source 510 such that the intensity in the area including the center of the cross sectional surface (optical axis of condensing optical system 82) is not nearly zero, but smaller than the intensity on the outer side of the area.

Mirror array 80, in the embodiment, has a base member BOA that has a surface which forms an angle of 45 degrees ($\pi/4$) with respect to the XY plane and an XZ plane (hereinafter caller a reference surface for the sake of convenience), e.g. M(=PxQ) mirror elements $81_{p,q}$ (p=1 to P, q=1 to Q) arranged in a matrix shape of, e.g. P rows and G columns, on the reference surface of base member BOA, and a drive section 87 (not shown in FIG. 4, refer to FIG. 11) including M actuators (not shown) that separately drive each mirror element $81_{p,q}$. Mirror array 80 can substantially form a large reflection surface parallel to the reference surface by adjusting tilt of numerous mirror elements $81_{p,q}$, with respect to the reference surface.

Each mirror element $81_{p,q}$ of mirror array 80, for example, is structured rotatable around a rotation axis parallel to one diagonal line of mirror element $81_{p,q}$, and a tilt angle of its reflection surface with respect to the reference surface can be set to an arbitrary angle within a predetermined angle range. The angle of the reflection surface of each mirror element is measured using a sensor that detects a rotation angle of the rotation axis, e.g. a rotary encoder $83_{p,q}$ (not shown in FIG. 4, refer to FIG. 11).

Drive section 87, for example, includes an electromagnet or a voice coil motor serving as an actuator, and the individual mirror elements $81_{p,q}$ are driven by the actuator and operate at an extremely high response.

Figure 6:
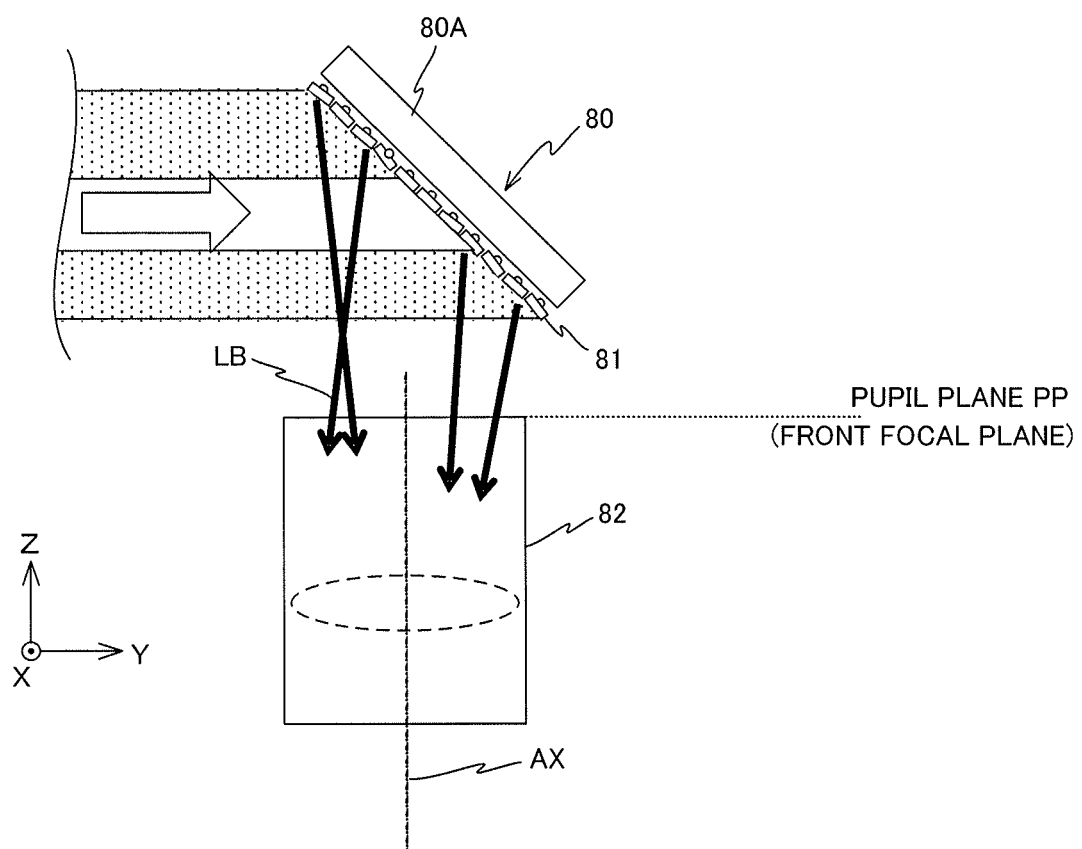
FIG. 6 is a view showing a state where a parallel beam from a light source is irradiated on a mirror array, and an incidence angle of a reflection beam from each of a plurality of mirror elements to a condensing optical system is individually controlled.

Of the plurality of mirror elements structuring mirror array 80, each of the mirror elements $81_{p,q}$ illuminated by the annular shape parallel beam from light source system 510 emits a reflection beam (parallel beam) according to the tilt angle of the reflection surface and makes the beam enter condensing optical system 82 (refer to FIG. 6). Note that although the reason for using mirror array 80 and the reason for making the annular shape parallel beam enter mirror array 80 in the embodiment is to be described later on, the parallel beam does not necessarily have to be an annular shape, and the cross sectional surface shape (cross sectional surface intensity distribution) of the parallel beam entering mirror array 80 may be made different from the annular shape, or beam section intensity conversion optical system 78 may not have to be provided.

Condensing optical system 82 is a high numerical aperture (N.A.) and low aberration optical system having a numerical aperture of, e.g. 0.5 or more, or preferably 0.6 or more. Because condensing optical system 82 has a large diameter, low aberration, and high N.A., the plurality of parallel beams from mirror array 80 can be condensed on a rear focal plane. Although details will be described later on, beam irradiation section 520 can condense the beam emitted from condensing optical system 82 into, e.g. a spot shape or a slit shape. In addition, because condensing optical system 82 is structured using one or a plurality of large diameter lenses (FIG. 4 representatively shows one large diameter lens), the area of incident light can be enlarged, which allows more light energy to be taken in when compared to the case of using a condensing optical system with a small N.A. Consequently, the beam condensed using condensing optical system 82 according to the embodiment is extremely sharp and will have high energy density, which is connected directly with improving the processing accuracy of additive manufacturing by shaping.

In the embodiment, as it will be described later on, a case in which shaping (machining processing) is performed by moving table 12 in a scan direction (the Y-axis direction as an example in FIG. 4) parallel to the XY plane and relatively scanning the beam and workpiece W that has target surface TAS of shaping at the upper end in the scan direction (scan direction). It goes without saying that table 12 may be moved in at least one of the X-axis direction, the Z-axis direction, the θx direction, the θy direction, and the θz direction, during the movement of table 12 in the Y-axis direction on shaping. In addition, as it will be described later on, powdery shaping material (metal material) supplied from material processing section 530 is melted by the energy of the laser beam. Consequently as it is previously described, if the total amount of energy that condensing optical system 82 takes in becomes larger, the amount of energy of the beam emitted from condensing optical system 82 becomes larger, and this increases the amount of metal that can be melted in a unit time. If the amount of the shaping material supplied and the speed of table 12 are increased accordingly, this increases throughput of shaping processing by beam shaping system 500.

However, even if the total output of the laser is increased using the method previously described, because the speed of the scanning operation of table 12 cannot actually be increased to infinity, throughput that takes full advantage of the laser power cannot be achieved. To solve this issue, in shaping apparatus 100 of the embodiment, as it will be described later on, an irradiation area of a slit shaped beam (hereinafter called a straight line area (refer to reference code LS in FIG. 9B)) can be formed instead of an irradiation area of a spot shaped beam on a predetermined plane (hereinafter called shaping surface) MP (refer to, e.g. FIGS. 4 and 9A) where target surface TAS of shaping is to be aligned, and shaping (machining processing) can be performed while relatively scanning workpiece W with respect to a beam forming straight line area LS (hereinafter called a straight line beam) in a direction perpendicular to the longitudinal direction of the beam. This allows a greatly broad area (e.g. an area larger by several times to several tens of times) to be processed at once when compared to the case of scanning the workpiece with a spot shaped beam. Note that, although shaping surface MP described above is a rear focal plane of condensing optical system 82 in the embodiment as it will be described later on, the shaping surface may be a surface near the rear focal plane. In addition, in the embodiment, although shaping surface MP is perpendicular to an optical axis AX at the exit side of condensing optical system 82, the surface does not have to be perpendicular.

As a method of setting or changing the intensity distribution of the beam on shaping surface MP (e.g. a method of forming the straight line area as in the description above), for example, a method can be employed in which an incidence angle distribution of the plurality of parallel beams incident on condensing optical system 82 is controlled. In a lens system that condenses the parallel beam at one point like condensing optical system 82 of the embodiment, the focal position at the rear focal plane (condensing plane) is determined by the incidence angle of parallel beam LB (e.g. refer to FIGS. 4 and 6) on pupil plane (entrance pupil) PP. The incidence angle here is decided from, a. an angle $\alpha(0 \leq \alpha < 90$ degrees $(\pi/2))$ which is an angle that the parallel beam incident on pupil plane PP of condensing optical system 82 forms with respect to an axis parallel to optical axis AX of condensing optical system 82, and b. a reference axis (e.g. an angle $\beta(0 \leq \beta < 360$ degrees $(2\pi))$ with respect to the X-axis $(X \geq 0)$) on a two-dimensional orthogonal coordinate system (X, Y) of an orthogonal projection to pupil plane PP (XY coordinate plane) of the parallel beam incident on pupil plane PP when the two-dimensional orthogonal coordinate system (X, Y) orthogonal to optical axis AX that has a point on optical axis AX serving as an origin is set on pupil plane PP. For example, the beam that is incident on pupil plane PP of condensing optical system 82 perpendicularly (parallel to the optical axis) condenses on optical axis AX, and the beam that is slightly tilted with respect to condensing optical system 82 (with respect to optical axis AX) condenses at a position slightly shifted from the position on optical axis AX. By using this relation and making the incidence angle (incident direction) of the plurality of parallel beams LB incident on pupil plane PP of condensing optical system 82 have an appropriate distribution when reflecting and making the parallel beam from light source system 510 enter condensing optical system 82, intensity distribution of the beam within shaping surface MP such as, e.g. at least one of position, number, size and shape of the irradiation area in shaping surface MP, can be arbitrarily changed. Consequently, it is naturally easy to form areas such as, e.g. a straight line area, a three line area, or a broken straight line area (refer to FIG. 10), and is also easy to form a spot shaped irradiation area. Note that although the incidence angle (incident direction) is described here using angle $\alpha$ and angle $\beta$, various ways may be considered of expressing the incidence angle (incident direction), and it goes without saying that the incidence angle (incident direction) of the parallel beam incident on pupil plane PP is not limited to the control using angle $\alpha$ and angle $\beta$ as parameters.

In condensing optical system 82 of the embodiment, since the structure is employed so that pupil plane (entrance pupil) PP coincides with the front focal plane, the condensing position of the plurality of parallel beams LB can be controlled accurately in a simple manner by changing the incidence angle of the plurality of parallel beams LB using mirror array 80, however, the structure of the pupil plane (entrance pupil) PP and the front focal plane coinciding does not necessarily have to be employed.

If the shape and size of the irradiation area formed on the shaping surface are not variable, the position of the irradiation area can also be changed by controlling the incidence angle of one parallel beam incident on the pupil plane of condensing optical system 82 using a solid mirror of a desired shape.

However, in the case of performing additive manufacturing (shaping) to the workpiece, the area of the target surface on which the target portion of shaping is not always set constantly on a flat surface. That is, relative scanning of the straight line beam is not always possible. At places such as near the outline of the workpiece, or around the border of a solid area and a hollow area, the border may be tilted, narrow or curved, making it difficult to apply relative scanning of the straight line beam. For instance, since it is difficult to paint out such an area with a wide brush, a thin brush corresponding to the area or a thin pencil will be necessary, that is to say, the brushes and the thin pencil are to be used to suit their use freely real time and continuously. Similarly, near the outline edge of the workpiece or around the border of the solid area and the hollow area, requirements such as changing the width in the scan direction (relative moving direction) of the irradiation area of the beam or changing the size (e.g. the length of the straight line beam), number or position (position of the irradiation point of the beam) of the irradiation area occur.

Therefore, in the embodiment, mirror array 80 is employed, and controller 600 makes each mirror element 81$_{p,q}$ operate at an extremely high response so that the incidence angle of the plurality of parallel beams LB entering pupil plane PP of condensing optical system 82 can be controlled respectively. This allows intensity distribution of the beam on shaping surface MP to be set or changed. In this case, controller 600 can change the intensity distribution of the beam on shaping surface MP, such as, for example, at least one of shape, size, and number of the irradiation area of the beam, during relative movement of the beam and target surface TAS (a surface on which target portion TA of shaping is set, and in the embodiment, a surface on workpiece W). In this case, controller 600 can continuously or intermittently change the intensity distribution of the beam on shaping surface MP. For example, it is possible to continuously or intermittently change the width of the straight line area in the relative moving direction during relative movement of the beam and target surface TAS. Controller 600 can also change the intensity distribution of the beam on shaping surface MP according to the relative position of the beam and target surface TAS. Controller 600 can also change the intensity distribution of the beam on shaping surface MP according to a required shaping accuracy and throughput.

In addition, in the embodiment, controller 600 detects the state of each mirror element (in this case, tilt angle of the reflection surface) using rotary encoder 83$_{p,q}$ previously described, and by this detection, monitors the state of each mirror element real time so that the tilt angle of the reflection surface of each mirror element of mirror array 80 can be accurately controlled.

Figure 7:
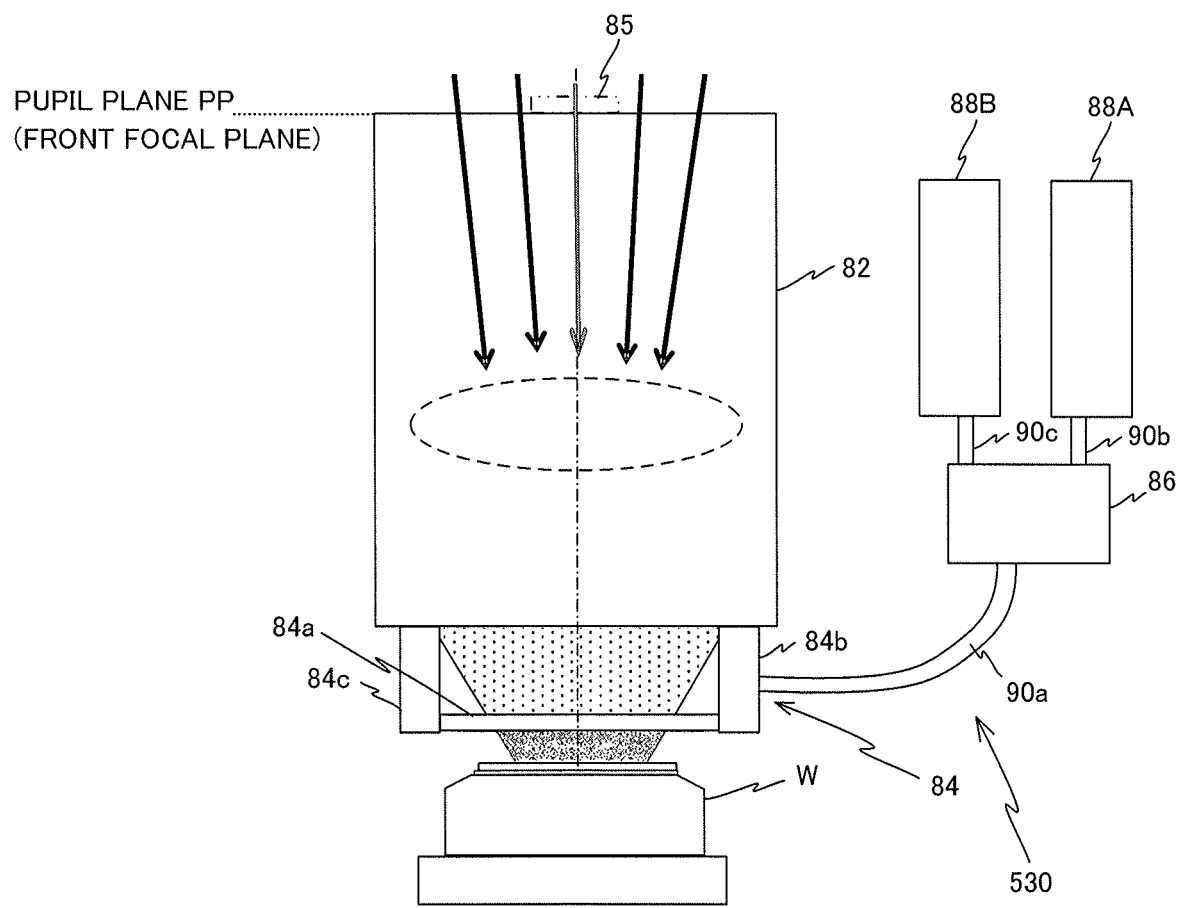
FIG. 7 is a view showing a material processing section that the beam shaping system is equipped with along with the condensing optical system.

Material processing section 530, as shown in FIG. 7, has a nozzle unit 84 which has a nozzle member (hereinafter shortly described as a nozzle) 84*a* provided below the exit plane of condensing optical system 82, a material supplying device 86 connected to nozzle unit 84 via a piping 90*a*, a plurality of, e.g. two, powder cartridges 88A and 88B each connected to material supplying device 86 via piping. FIG. 7 shows a portion below condensing optical system 82 shown in FIG. 4, when viewed from the −Y direction.

Nozzle unit 84 extends in the X-axis direction below condensing optical system 82, and is equipped with a nozzle 84*a* that has at least one supplying port for supplying powdered shaping material, and a pair of support members 84*b* and 84*c* that support both ends in the longitudinal direction of nozzle 84*a* and also have each upper end connected to the housing of condensing optical system 82. To one of the support members, 84*b*, one end (the lower end) of material supplying device 86 is connected via piping 90*a*, and support member 84*b* has a supply path formed inside that communicates piping 90*a* with nozzle 84*a*. In the embodiment, nozzle 84*a* is placed directly below the optical axis of condensing optical system 82, and in its lower surface (bottom surface), has a plurality of supply ports provided that will be described later on. Note that nozzle 84*a* does not necessarily have to be placed on the optical axis of condensing optical system 82, and may be placed at a position slightly shifted from the optical axis to one side of the Y-axis direction.

To the other end (the upper end) of material supplying device 86 is connected to piping 90*b* and 90*c* serving as supply paths to material supplying device 86, and powder cartridges 88A and 88B are connected to material supplying device 86 via piping 90*b* and 90*c*, respectively. In one of the powder cartridges, 88A, powder of a first shaping material (e.g. titanium) is stored. In the other powder cartridge, 88B, powder of a second shaping material (e.g. stainless steel) is stored.

Note that in the embodiment, although shaping apparatus 100 is equipped with two powder cartridges for supplying two types of shaping material to material supplying device 86, the number of powder cartridges that shaping apparatus 100 is equipped with may be one.

While the powder from powder cartridges 88A and 88B to material supplying device 86 may be supplied so that powder cartridges 88A and 88B each have a function of forcibly supplying the powder to material supplying device 86, in the embodiment, material supplying device 86 is made to have a function of switching between piping 90*b* and 90*c*, as well as a function of performing suction of the powder from either powder cartridge 88A or 88B by using vacuum. Material supplying device 86 is connected to controller 600 (refer to FIG. 11). Material supplying device 86 is connected to controller 600 (refer to FIG. 11). At the time of shaping, controller 600 performs switching between piping 90*b* and 90*c* using material supplying device 86, selectively chooses between the powder of the first shaping material (e.g. titanium) from powder cartridge 88A and the powder of the second shaping material (e.g. stainless steel) from powder cartridge 88B, and supplies the powder of one of the shaping materials to nozzle 84*a* from material supplying device 86 via piping 90*a*. Note that by changing the structure of material supplying device 86, a structure may be employed in which the powder of the first shaping material from powder cartridge 88A and the powder of the second shaping material from powder cartridge 88B are supplied simultaneously to material supplying device 86 when necessary, and the mixture of the two shaping materials can be supplied to nozzle 84*a* via piping 90*a*. Note that a nozzle connectable to powder cartridge 88A and another nozzle connectable to powder cartridge 88B may be provided below condensing optical system 82 so as to supply the powder at the time of shaping from either one of the nozzles, or from both of the nozzles.

In addition, controller 600 can adjust the supply amount per unit time of the shaping material supplied to nozzle 84*a* from powder cartridges 88A and 88B via material supplying device 86. For example, by adjusting the amount of powder supplied to material supplying device 86 from at least either one of powder cartridges 88A or 88B, the amount of shaping material per unit time supplied to nozzle 84*a* via material supplying device 86 can be adjusted. For example, by adjusting the vacuum level used to supply the powder to material supplying device 86 from powder cartridges 88A and 88B, the amount of shaping material per unit time supplied to nozzle 84*a* can be adjusted. Alternately, it is also possible to adjust the amount of shaping material per unit time supplied to nozzle 84*a* by providing a valve for adjusting the amount of powder supplied to piping 90*a* from material supplying device 86.

Figure 8:
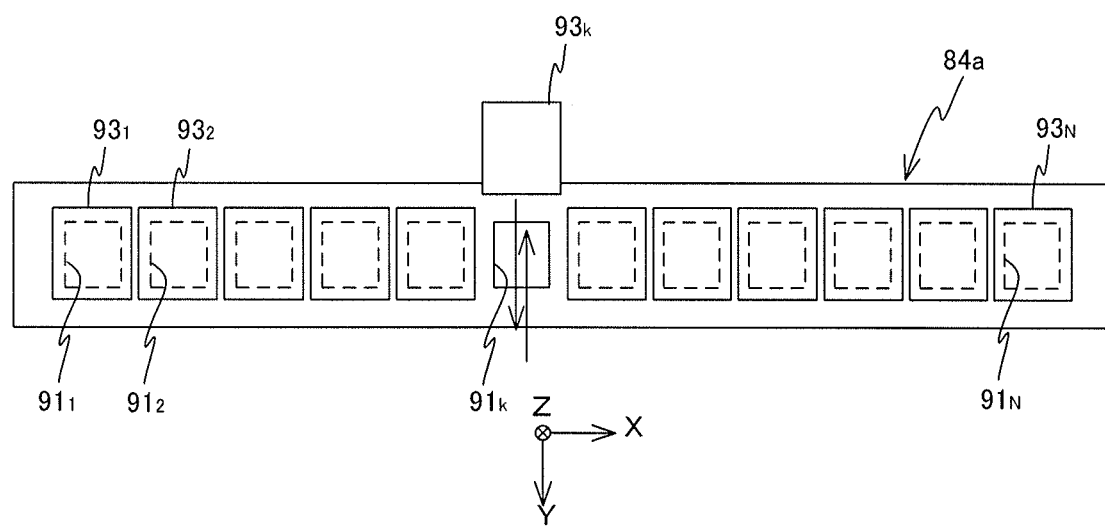
FIG. 8 is a view showing a plurality of supply ports formed in a nozzle of the material processing section and an open/close member which opens/closes each of the plurality of supply ports.

Here, although it is not shown in FIG. 7, a plurality of, e.g. N supply ports 91$_i$ (i=1 to N), are actually formed at an equal spacing in the X-axis direction on the lower surface (bottom surface) of nozzle 84*a* and each supply port 91$_i$ can be opened/closed individually by an open/close member 93$_i$, as shown in FIG. 8. Note that FIG. 8, for the sake of convenience, shows 12 supply ports $91_1$ as an example, and is drawn to explain the relation between the supply port and the open/close member. However, the number of supply ports formed is actually more than 12 and the partition between adjacent supply ports is narrower. However, the number of supply ports is not limited, as long as the supply ports are arranged along almost the entire length in the longitudinal direction of nozzle 84*a*. For example, the supply port may be one slit shaped opening that is arranged along almost the entire length in the longitudinal direction of nozzle 84*a*.

Open/close member $93_1$, as is representatively shown as 93*k* in FIG. 8 indicated by an arrow as the $k^{th}$ open/close member, is drivable sliding in the +Y direction and −Y direction to open/close supply port $91_1$. Open/close member $93_1$ is not limited to the slide drive, and may be structured rotatable in the inclination direction with one end serving as a center.

Each open/close member $93_1$ is driven and controlled by controller 600, via an actuator not shown. Controller 600 performs open/close control of each of the plurality of supply ports, e.g. N supply ports $91_1$, using each open/close member $93_1$ according to the intensity distribution of the beam on the shaping surface, such as for example, setting (or change) of the shape, the size, and the arrangement of the irradiation area of the beam formed on the shaping surface. This allows the supply operation of the shaping material by material processing section 530 to be controlled. In this case, controller 600 selects at least one supply port of the plurality of supply ports $91_1$, and only open/close member $93_1$ that closes the selected at least one supply port operates under the open control, or for example, is driven in the −Y direction. Consequently, in the embodiment, the shaping material can be supplied using only a part of the plurality of, or N supply ports $91_1$.

In addition, according to at least one of the supply amount control per unit time of the shaping material supplied to nozzle 84*a* via material supplying device 86 and the open/close control using the arbitrary open/close member $93_1$ previously described, controller 600 can adjust the supply amount per unit time of the shaping material from supply port $91_1$ opened/closed by the arbitrary open/close member $93_1$. Controller 600 determines the supply amount per unit time of the shaping material from the arbitrary supply port $91_1$ according to the intensity distribution of the beam on the shaping surface, such as setting (or change) of the shape, the size, and the arrangement of the irradiation area of the beam formed on the shaping surface. Controller 600 determines the supply amount per unit time from each supply port $91_1$ based on, for example, the width of the scan direction of the straight line area previously described.

Note that a structure may be employed in which the opening degree of each supply port $91_1$; is adjustable with each open/close member $93_1$. In this case, controller 600 may adjust the opening degree of each supply port $91_1$ with each open/close member $93_1$, for example, according to the width of the scan direction of the straight line area previously described.

Other than this, at least one supply port that supplies the powdered shaping material may be movable. For example, a structure may be employed in which one slit shaped supply port extending in the X-axis direction is formed on the lower surface of nozzle 84*a* and nozzle 84*a* is made movable, for example, in at least either the X-axis direction or the Y-axis direction with respect to the pair of support members 84*b* and 84*c*, and controller 600 may move nozzle 84*a* that has the supply port formed on its lower surface according to intensity distribution change of the beam on the shaping surface, that is, change in shape, size, and position of the irradiation area of the beam. Note that nozzle 84*a* may also be movable in the Z-axis direction.

Or, nozzle 84*a* may be structured from a main section and at least two movable members that are movable in at least one of the X-axis direction and the Y-axis direction within the XY plane with respect to the main section and have a supply port formed at the bottom surface, and at least a part of the movable members may be moved, by controller 600, according to intensity distribution change of the beam on the shaping surface. Also in this case, at least a part of the movable members may be movable in the Z-axis direction.

Further, a structure may be employed in which one supply port and another supply port of the plurality of supply ports are relatively movable. Or, for example, the position in the Y-axis direction may differ between the one supply port described above and the another supply port described above. Or, the position in the Z-axis direction may differ between the one supply port described above and the another supply port described above.

Note that moving of at least one supply port may be performed not only with setting or changing the intensity distribution of the beam, but may be moved also for other purposes.

As is previously described, the plurality of supply ports $91_1$ provided at nozzle 84*a* are arranged orthogonal to the optical axis of condensing optical system 82 in the X-axis direction at an equal spacing across the entire length of nozzle 84*a*, with only little space between adjacent supply ports $91_1$. Therefore, as indicated by a black arrow in FIG. 9A, if the powdered shaping material. PD is supplied directly down along the Z-axis direction parallel to optical axis AX of condensing optical system 82 from each of the plurality of supply ports $91_1$ of nozzle 84*a*, then shaping material PD will be supplied to the straight line area LS (irradiation area of the straight line beam) previously described directly below optical axis AX of condensing optical system 82. In this case, the supply of shaping material PD from nozzle 84*a* can be performed by using self-weight of shaping material PD or by blowout to which a slight blowout pressure is applied. Consequently, a complicated mechanism such as a gas flow generation mechanism for guiding the shaping material in the case when the shaping material is supplied from an oblique direction with respect to the target surface of the shaping will not be required. In addition, it is extremely advantageous that the shaping material can be supplied perpendicularly at close range to the workpiece as in the embodiment when securing processing accuracy on shaping.

Note that a gas supply port may be provided at nozzle 84*a*. The gas flow of the gas supplied from the gas supply port may be used to guide the shaping material supplied or may be used for other purposes such as to contribute to shaping.

In the embodiment, since the annular shape parallel beam is irradiated on mirror array 80, the reflection beam from mirror array 80 enters a partial area (a partial area where N.A. is large) near the periphery of condensing optical system 82 and is condensed at the exit end of condensing optical system 82, that is on shaping surface MP (coincides with the rear focal plane of condensing optical system 82 in the embodiment) of condensing optical system 82 via an area in a peripheral end part distanced from the optical axis of a terminal end lens positioned at the exit end of beam irradiation section 520 (refer to FIG. 4). That is, the straight line beam, for example, is formed only by the light that passes through the area near the periphery of the same condensing optical system 82. Therefore, a beam spot (laser spot) with high quality can be formed when compared to the case when a beam spot light that passes separate optical systems are condensed on the same area. In addition, in the embodiment, a limit can be set to the beam irradiated on nozzle 84a provided in the center below the exit plane (lower end surface) of condensing optical system 82. Therefore, in the embodiment, it becomes possible to use all the reflection beams from mirror array 80 to form the spot, and parts such as a light shielding member to limit the beam irradiating on nozzle 84a will not necessarily have to be arranged at the part corresponding to nozzle 84a on the incident surface side of condensing optical system 82. For such reasons, the annular shape parallel beam is used to illuminate mirror array 80.

Note that the optical member positioned at the exit end of condensing optical system 82 only has to be a member that at least can form an optical surface at an area distanced from an optical axis of a surface on the exit side and condense a beam on a shaping surface (rear focal plane) via the optical surface. Consequently, this optical member may be a member having at least one of the exit surface and the incidence plane perpendicular to the optical axis of condensing optical system in the area including the optical axis, or having a hole formed in the area including the optical axis. The optical member positioned at the exit end of condensing optical system 82 may be structured arranging a donut shaped condensing lens with a hole in the center part area including the optical axis.

Note that to limit the beam incident on nozzle 84a from condensing optical system 82, for example, a limit member 85 indicated by a double dotted line in FIG. 7 may be provided at the incidence plane side (e.g. pupil plane PP) of condensing optical system 82. Limit member 85 limits the beam from condensing optical system 82 when entering nozzle 84a. As limit member 85, although a light shielding member may be used, parts such as a light attenuation filter may also be used.

In such a case, the parallel beam incident on condensing optical system 82 may be a parallel beam having a circular sectional shape, or may be an annular shape beam. In the latter case, because the beam is not irradiated on limit member 85, it becomes possible to use the reflection beam from mirror array 80 exclusively for forming the spot.

Note that although the beam incident on nozzle 84a from condensing optical system 82 does not necessarily have to be shielded completely, to prevent the beam from condensing optical system 82 being incident on nozzle 84a, the beam may be made incident only from separate periphery end part areas (e.g. two circular arc areas) at both sides of the optical axis in the Y-axis direction at the exit plane of a terminal end lens of condensing optical system 82.

Water shower nozzle 540 (refer to FIG. 11) is used on the so-called quenching. Water shower nozzle 540 has a supply port that supplies a cooling liquid (cooling water) and spouts the cooling liquid at a cooling target. Water shower nozzle 540 is connected to controller 600 (refer to FIG. 11).

Controller 600 controls light source unit 60 on quenching so that thermal energy of the beam from beam irradiation section 520 is adjusted to an appropriate value for quenching. Then, after irradiating the beam on the surface of the workpiece to increase the temperature to a high degree, controller 600 can perform quenching by spouting the cooling liquid at the high temperature part to rapidly cool the part, via water shower nozzle 540. In this case, it is also possible to perform additive manufacturing to the workpiece according to three-dimensional shaping and quenching simultaneously.

Note that when the quenching process is performed simultaneously with the additive manufacturing, it is desirable to use a metal having excellent quenchability as the shaping material.

Figure 9A:
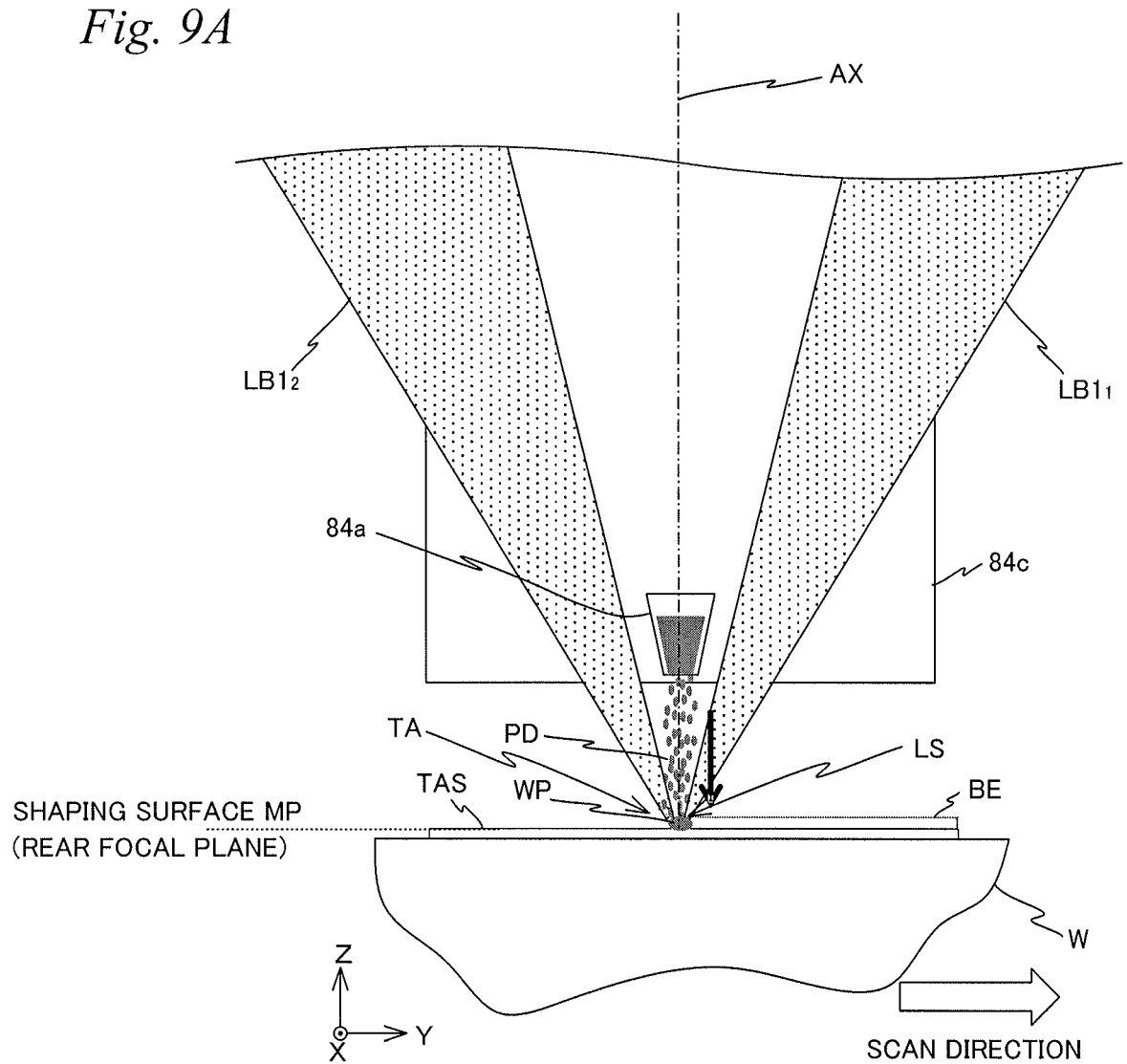
FIG. 9A is a view showing circle A in FIG. 4 enlarged.
Figure 9B:
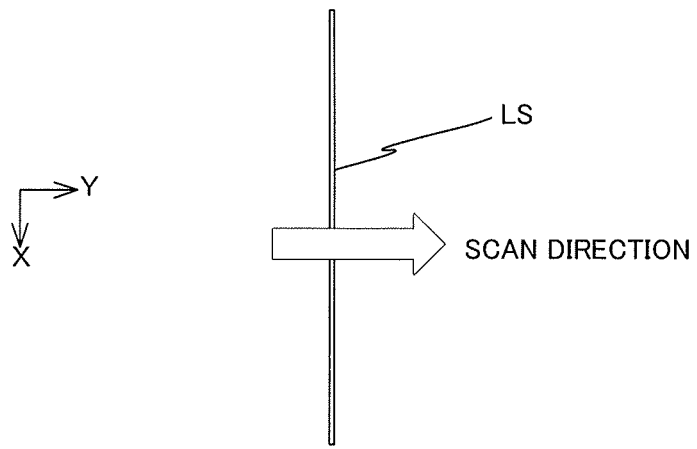
FIG. 9B is a view showing a relation between a straight line area and scan direction shown in FIG. 9A.

In the embodiment, at the time of additive manufacturing or the like to the workpiece, as is shown in FIG. 9A which is an enlarged view of FIG. 4 and circle A of FIG. 4, the beam (illustrated as beams $LB1_1$ and $LB1_2$ for the sake of convenience in FIG. 9A) that passes though the vicinity of the periphery end part of condensing optical system 32 and though the optical path of nozzle 84a on the +Y side and −Y side (the front and the rear of the scan direction of workpiece W (table 12)) is condensed directly below nozzle 84a, and straight line area LS with a longitudinal direction in the X-axis direction (orthogonal direction of the page surface in FIG. 9A) is formed on the shaping surface (refer to FIG. 9B), and to the straight line beam that forms straight line area LS, powdered shaping material PD is supplied along the Z-axis (along an XZ plane including optical axis AX) parallel to optical axis AX of condensing optical system 82 via the plurality of supply ports $91_1$ of nozzle 84a. This forms a linear molten pool WP extending in the X-axis direction directly below nozzle 84a. Formation of such molten pool WP is performed while table 12 is scanned in the scan direction (+Y direction in FIG. 9A). This makes it possible to form a bead (melted and solidified metal) BE of a predetermined width that covers the length in the longitudinal direction (X-axis direction) of the straight line beam (molten pool WP). Note that beams $LB1_1$ and $LB1_2$ shown in FIG. 9A may be separate parallel beams that are incident on pupil plane PP of condensing optical system 82 at different incidence angles each reflected by different mirror elements $81_{p,q}$ of mirror array 80, or may be the same parallel beam, such as for example, a part of a parallel beam having an annular sectional shape.

In the case of making the plurality of parallel beams enter pupil plane PP of condensing optical system 82, when the incidence angle of the plurality of parallel beams LB incident on condensing optical system 82 is adjusted, for example, so that the number of parallel beams LB incident on condensing optical system 82 are not reduced while the width in the X-axis direction or the Y-axis direction or both of the straight line beam are gradually narrowed, condensing density (energy density) of the beam increases. Consequently, in response, by increasing the supply amount of the powder (shaping material) per unit time and increasing the scan speed of target surface TAS, it becomes possible to keep the thickness of bead BE to be formed constant, and also to keep the level of throughput high. However, such adjustment method is not limiting, and other adjustment methods can be used to keep the thickness of bead BE to be formed constant. For example, laser output (energy amount of the laser beam) of at least one of the plurality of laser units 70 may be adjusted according to the width in the X-axis direction or the Y-axis direction or both of the straight line beam, or the number of parallel beams LB incident on condensing optical system 82 from mirror array 80 may be changed. In this case, although the throughput slightly decreases when compared to the adjustment method described above, the adjustment is simple.

FIG. 11 shows a block diagram indicating an input/output relation of controller 600 that mainly structures a control system of shaping apparatus 100. Controller 600 includes a workstation (or a microcomputer) and the like and has overall control over constituent parts of shaping apparatus 100.

The basic function of shaping apparatus 100 according to the embodiment structured in the manner described above is to add a desired shape by three-dimensional shaping to an existing component (workpiece). The workpiece is supplied to shaping apparatus 100 and then is carried out from shaping apparatus 100 after a desired shape is accurately added. At this point, the actual shaping data of the shape that has been added is sent to an external device, such as a host device. The series of operations performed in shaping apparatus 100 is roughly in the manner described below.

First, when table 12 is at a predetermined loading/unloading position, workpiece W is loaded on table 12 by workpiece carrier system 300. At this time, table 12 is in the reference state (Z, θx, θy, θz)=(Z$_0$, 0, 0, 0) previously described, and the XY position of table 12 coincides with the X, Y position of slider 10 measured by position measurement system 28.

Next, controller 600 moves table 12 on which workpiece W is loaded to an area below measurement system 400. The movement of table 12 is performed by controller 600 controlling planar motor 26 based on the measurement information of position measurement system 28 so that slider 10 is driven in the X-axis direction (and the Y-axis direction) on base BS. Table 12 maintains the reference state previously described also during this movement.

Next, controller 600 performs measurement of position information within a three-dimensional space (shape information in the embodiment) which is at least a part of target surface TAS on workpiece W that is on table 12 in a reference state, using measurement system 400. Hereinafter, it becomes possible to control the position in directions of 6-DOF of target surface TAS on workpiece W that is on the table coordinate system (reference coordinate system) according to open loop control, based on the measurement results.

Next, controller 600 moves table 12, on which workpiece W having completed measurement of shape information of at least a part of target surface TAS is mounted, to an area below beam shaping system 500.

Next, additive manufacturing according to three-dimensional shaping is performed in which the shape corresponding to 3D data is added to the workpiece on table 12. This additive manufacturing is performed as follows.

That is, controller 600 converts the three-dimensional CAD data of the shape to be added by additive manufacturing (shape in which the shape of the workpiece subject to additive manufacturing is removed from the shape of the object made after additive manufacturing has been applied) serving as three-dimensional shaping data to, e.g. STL (Stereo Lithography) data, and then furthermore generates data for each layer sliced in the Z-axis direction from this three-dimensional STL data. Then, controller 600 controls movement system 200 and beam shaping system 500 so that additive manufacturing is performed on each layer of the workpiece based on the data of each layer, and repeatedly performs formation of the straight line area and formation of the linear (slit shaped) molten pool by supplying shaping material from nozzle 84*a* to the straight line beam while scanning table 12 in the scan direction, for each layer. Here, position and attitude control of the target surface on the workpiece at the time of additive manufacturing is performed taking into consideration the target surface measured earlier.

Here, in the description above, shaping accompanied with scanning operation of table 12 is to be performed presupposing that target surface (e.g. upper surface) TAS on which target portion TA of additive manufacturing of workpiece W is set is a plane set to a surface perpendicular to the optical axis of condensing optical system 82 by adjusting the tilt of table 12. However, the target surface where the target portion of additive manufacturing of the workpiece is set is not always a plane where the straight line beam can be used. However, shaping apparatus 100 according to the embodiment is equipped with movement system 200 that can set arbitrarily the position of table 12 on which the workpiece is loaded in directions of 6-DOF. Therefore, in such a case, controller 600, while controlling measurement system 200 and beam irradiation section 520 of beam shaping system 500 based on the three-dimensional shape of the workpiece measured using measurement system 400 and adjusting the width in the X-axis direction of the beam irradiation area on shaping surface MP so that the target surface (e.g. upper surface) of workpiece W positioned on shaping surface MP can be regarded flat enough so that additive manufacturing can be performed in the irradiation area of the beam in shaping surface MP, performs the open/close operation of each supply port 91*i* via each open/close member 93*i* of nozzle 84*a* and supplies the shaping material from the required supply ports to the beam irradiated on the irradiation area. This allows the shaping to be applied at necessary parts even when the upper surface (target surface) of the workpiece is not flat.

Note that on performing shaping by forming layers of beads, additive manufacturing (bead formation) may be performed with a beam whose width in the X-axis direction of the irradiation area in the shaping surface is narrow, and after forming a plane having a relatively large area, additive manufacturing (bead formation) may be performed on the plane using a straight line beam whose width in the X-axis direction of the irradiation area in the shaping surface is widened. For example, on performing shaping on an uneven target surface, additive manufacturing (bead formation) to fill the recess part may be performed with a beam whose width in the X-axis direction of the irradiation area in the shaping surface is narrow, and after forming a plane, additive manufacturing (bead formation) may be performed on the plane using a straight line beam whose width in the X-axis direction of the irradiation area in shaping surface MP is widened. Even in such a case, it goes without saying that the powdered shaping material is supplied from one or the plurality of supply ports that are chosen in response to the change of size (width) of the irradiation area of the beam in shaping surface MP.

After the additive manufacturing to workpiece W has been completed, controller 600 moves table 12 on which workpiece W that has undergone additive manufacturing is loaded to the loading/unloading position previously described.

Next, controller 600 gives instructions to workpiece carrier system 300 to unload the workpiece. In response to the instructions, workpiece carrier system 300 takes workpiece W that has undergone additive manufacturing from table 12 and carries the workpiece outside of shaping apparatus 100. Then, controller 600 sets table 12 of movement system 200 to a reference state. In this manner, movement system 200 is to wait at the loading/unloading position in preparation for delivery of the next workpiece.

As is described in detail so far, with shaping apparatus 100 and the shaping method performed by shaping apparatus 100 according to the embodiment, the intensity distribution of the beam within shaping surface MP previously described can be changed continuously when necessary not only before starting the shaping of relatively moving the beam and target surface TAS but also during the relative movement of the beam and target surface TAS, and can also be changed according to the relative position of target surface TAS and the beam and to the required shaping accuracy and throughput. This allows shaping apparatus 100 to form a shaping object on target surface TAS of workpiece W with high processing accuracy and high throughput by, e.g. rapid prototyping.

Figure 12A:
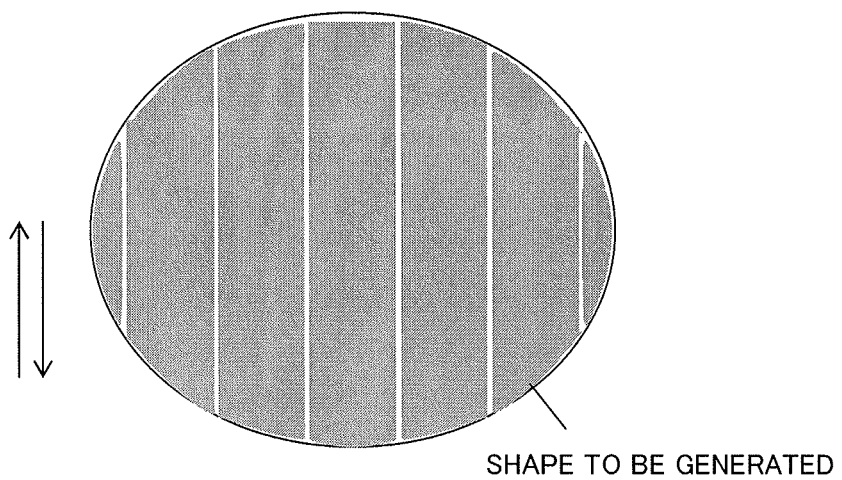
FIGS. 12A and 12B are views used for describing an effect of the shaping apparatus according to the embodiment in comparison with the conventional art.
Figure 12B:
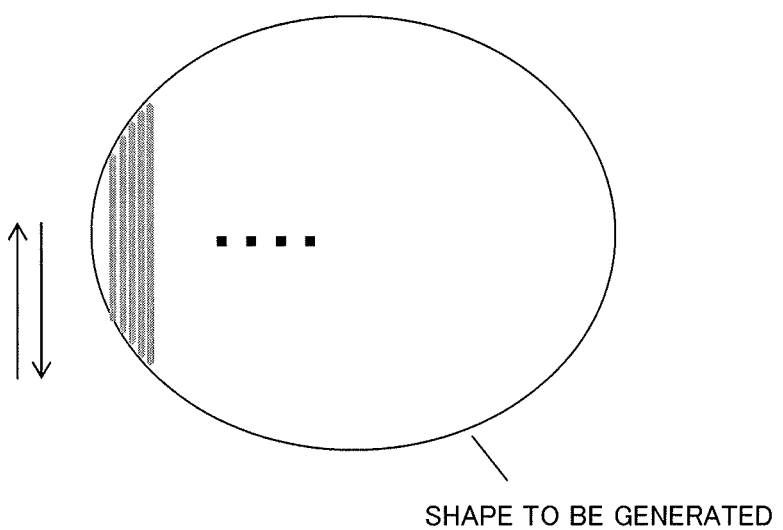

In addition, in shaping apparatus 100 and the shaping method performed by shaping apparatus 100, in the case of performing additive manufacturing (shaping) of a relatively wide area on a flat target surface TAS, the method previously described is employed in which powdered shaping material PD is supplied from nozzle 84*a* to the straight line beam to form a linear molten pool WP directly below nozzle 84*a* and molten pool WP is formed scanning table 12 in the scan direction (+Y direction in FIG. 4). With this method, a shape that was generated by reciprocating the spot shaped beam dozens of times with the conventional 3D printer or the like as shown in FIG. 12B can be generated by reciprocating table 12 with respect to the straight line beam several times as shown in FIG. 12A. With the embodiment, the shaping object can be formed on the target surface of the workpiece in an extremely short time when compared to the shaping that uses the conventional spot shaped beam in the so-called one-stroke shaping. That is, throughput can be improved also in this respect.

In addition, with shaping apparatus 100 and the shaping method performed by shaping apparatus 100, according to the embodiment, because the intensity distribution change of the beam within the shaping surface of condensing optical system 82 is performed by changing the tilt angle of the reflection surface of each mirror element of mirror array 80, as the intensity distribution change, change of at least one of position, number, size and shape of the irradiation area of the beam within the shaping surface can be easily performed. Consequently, by setting the irradiation area, for example, to a spot shape or a slit shape (line shape), and applying the three-dimensional shaping to the target surface on the workpiece using the method previously described, a three-dimensional shaped object can be formed with high accuracy.

In addition, shaping apparatus 100 according to the embodiment has a plurality of, e.g. two powder cartridges 88A and 88B, and inside each of the powder cartridges 88A and 88B, the powder of the first shaping material (e.g. titanium) and the powder of the second shaping material (e.g. stainless steel) are stored. And, at the time of additive manufacturing (at the time of shaping), controller 600 performs switching of the supply path of the powder to nozzle unit 84 using material supplying device 86, that is, performs switching between piping 90*b* and 90*c*. By this switching, the powder of the first shaping material (e.g. titanium) from powder cartridge 88A and the powder of the second shaping material (e.g. stainless steel) from powder cartridge 88B is selectively supplied to nozzle unit 88A. Consequently, by only switching the powder material that controller 600 supplies depending on the section, joint shape of different kinds of materials can be generated easily. In addition, the switching can be performed almost instantly. Furthermore, by supplying different kinds of materials that are mixed, an "alloy" can be made on the spot, or the composition may be changed or gradated depending on location.

Note that in the embodiment above, the case has been described where an irradiation area of a single linear beam (straight line beam) is formed with beam shaping system 500 and workpiece W is scanned in the scan direction (e.g. Y-axis direction) with respect to the straight line beam. However, with beam shaping system 500, as is previously described, by making the incidence angle of the plurality of parallel beams LB incident on condensing optical system 82 have an appropriate distribution, the intensity distribution of the beam in shaping surface MP can be changed freely. Consequently, with shaping apparatus 100, at least one of position, number, size and shape of the irradiation area of the beam on shaping surface MP can be changed, and as is previously described, areas such as, e.g. a straight line area, a three line area, or a broken straight line area (refer to FIG. 10) can be formed as the irradiation area of the beam.

Figure 13:
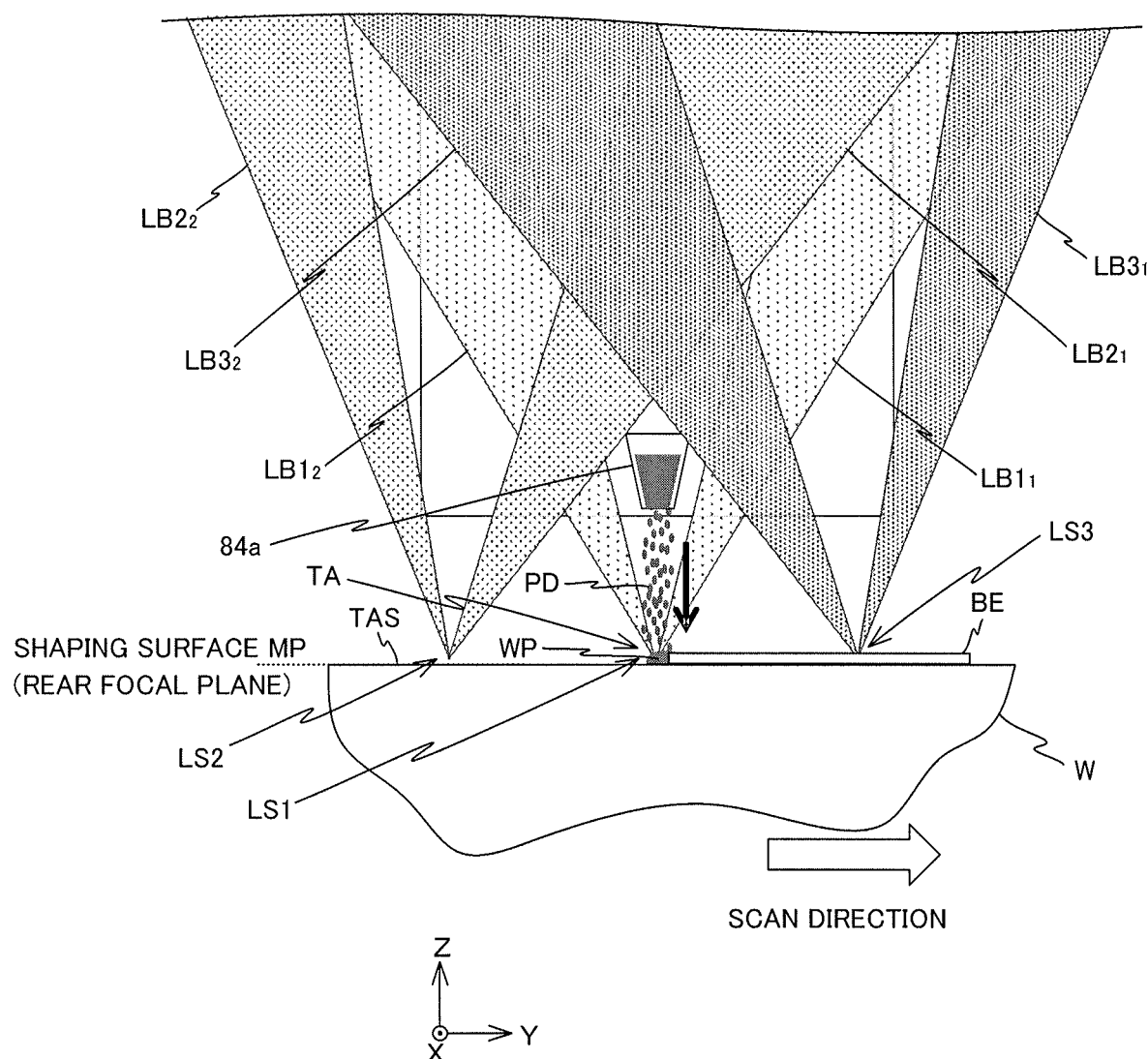
FIG. 13 is a view used for describing an example of performing additive manufacturing to a workpiece using three beams each formed in three straight line areas.
Figure 14:
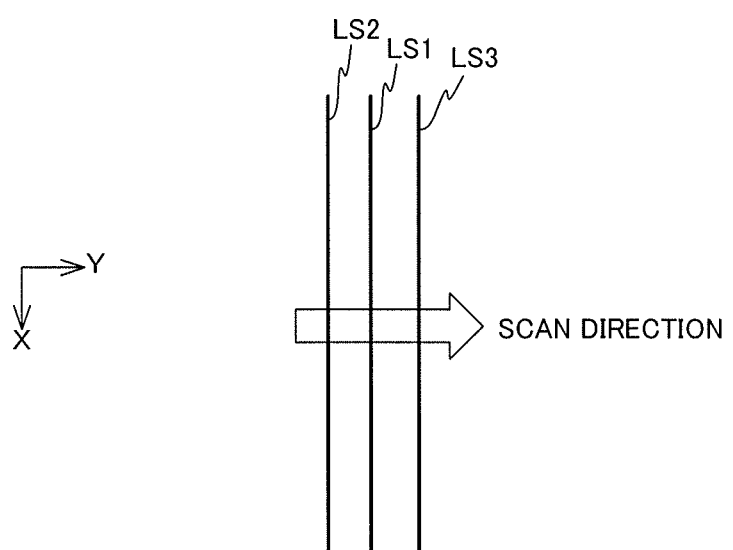
FIG. 14 is a view showing a relation between placement of the three straight line areas shown in FIG. 13 and a scan direction.

FIG. 13, as an example, shows a situation where additive manufacturing to workpiece W is performed using three straight line beams irradiated on each of the three straight line areas that structure the three line area previously described. As shown in FIG. 13, beams $LB1_1$ and $LB1_2$ that pass the peripheral end part of condensing optical system 82 and pass the optical path at the front and rear of the scan direction of workpiece W (table 12) with respect to nozzle 84*a* are condensed directly below (the plurality of supply ports of) nozzle 84*a*, and a slit shaped (line shape) first straight line area LS1 with a longitudinal direction in the X-axis direction (orthogonal direction of the page surface in FIG. 13) is formed on the shaping surface. At this time, target surface TAS where target portion TA of workpiece W is set is positioned to shaping surface MP. In addition, beams $LB2_1$ and $LB2_2$ that pass the peripheral end part of condensing optical system 82 and pass the optical path at the rear of the scan direction with respect to nozzle 84*a* are condensed, and at a position a predetermined distance apart in the rear of the scan direction of the first straight line area LS1, a second straight line area LS2 is formed extending in the X-axis direction in the same length as the first straight line area LS1, parallel to the first straight line area LS1. In addition, beams $LB3_1$ and $LB3_2$ that pass the peripheral end part of condensing optical system 82 and pass the optical path at the front of the scan direction with respect to nozzle 84*a* are condensed, and at a position a predetermined distance apart in the front of the scan direction of the first straight line area LS1, a third straight line area LS3 is formed extending in the X-axis direction in the same length as the first straight line area LS1, parallel to the first straight line area LS1. FIG. 14 shows a relation between the three straight line areas LS1, LS2, and LS3 shown in FIG. 13 and the scan direction within the XY plane.

Note that beams $LB1_1$, $LB1_2$, $LB2_1$, $LB2_2$, $LB3_1$, and $LB3_2$ illustrated in FIG. 13 are schematically shown, and the optical path of at least one beam incident on each straight line area, the number of the beams and the like can be set or changed, for example, by controlling mirror array 80.

Here, as is previously described, of the three straight line areas LS1, LS2, and LS3, by supplying powdered shaping material PD from nozzle 84*a* to a straight line beam (hereinafter called a first straight line beam for the sake of convenience) that forms straight line area LS1 positioned in the center in the scan direction of table 12, a linear molten pool WP is formed directly below the plurality of supply ports of nozzle 84*a*, and such formation of molten pool WP is performed while workpiece W (table 12) is scanned in the scan direction (+Y direction in FIG. 13).

A straight line beam (hereinafter called a second straight line beam for the sake of convenience) that forms straight line area LS2 positioned in the rear of the scan direction (in the rear of the advancing direction) of table 12 with respect to the first straight line area LS1, as an example, plays the role of preheating (heating to a moderate temperature) the surface (target portion of the target surface) of workpiece W before shaping is applied. When such preheating is not performed, a large temperature difference occurs between the high-temperature metal melted by the laser beam and the low-temperature workpiece (target surface) that causes rapid cooling of the melted metal solidifying in an instant and making a dry and crumbling lump. This is a key factor that worsens surface accuracy of the processing surface (surface of the shaping section), surface roughness and the like. On the other hand, by heating the surface of workpiece W (target surface) with the second straight line beam in advance to reduce the temperature difference between the melted metal and workpiece W (target surface), the solidifying speed of the melted metal on workpiece W (target surface) becomes slower, which allows time to spare for the melted metal to spread due to surface tension acting on the surface (target surface) of workpiece W. As a consequence, excellent surface accuracy and surface roughness can be achieved.

A straight line beam (hereinafter called a third straight line beam for the sake of convenience) that forms straight line area LS3 positioned in the front of the scan direction (in the front of the advancing direction) of table 12 with respect to the first straight line area LS1, as an example, provides laser polishing action of the shaping material (metal material) that has adhered and solidified (hardened) on the surface (target portion of the target surface) of workpiece W, namely the surface of bead BE. Surface polishing using a laser beam is known as a common technique, and by performing polishing immediately with the third straight line beam, good surface accuracy and surface roughness that normally cannot be acquired by applying additive manufacturing (shaping) once can be achieved.

Especially in the additive manufacturing to workpiece W illustrated in FIG. 13, while workpiece W (table 12) is scanned once in the scan direction, heating of the surface of workpiece W in advance (preheating), formation of the molten pool and bead with respect to the workpiece, and laser polishing of the surface of the bead that are described above can be performed. Note that the second straight line beam in the case of FIG. 13 may be used not only for preheating but for other uses as well. Similarly, the third straight line beam may be used for uses other than laser polishing. For example, three nozzles may be provided corresponding to the arrangement of the first, second, and third straight line areas LS1, LS2, and LS3, and three linear molten pools having predetermined widths may be formed simultaneously on the shaping surface of workpiece W with the first, second, and third straight line beams.

Note that in the case the scan direction of workpiece W (table 12) is set in the −Y direction opposite to FIG. 13, the third straight line beam is to play the role of heating the surface of workpiece W to a moderate temperature and the second straight line beam is to play the role of laser polishing the surface of the metal material that has adhered and temporarily solidified on the surface of workpiece W.

Note that in the description above, while the case has been described where in addition to an irradiation area (a first straight line area) of the first straight line beam used for forming the molten pool with respect to the workpiece, an irradiation area (a second straight line area) of the second straight line beam used for heating the surface of workpiece W in advance (preheating) and an irradiation area (a third straight line area) of the third straight line beam used for laser polishing the surface of the bead formed are formed separate to one another on the shaping surface, for example, the first straight line area and the second straight line area may have at least an overlapping part. In addition, at least one of the second straight line area LS2 and the third straight line area LS3 may be different from the first straight line area LS1 in at least one of shape and size. In addition, since at least one of the second straight line beam and the third straight line beam does not necessarily have to be used, at least one of the second straight line area and the third straight line area does not necessarily have to be formed on the shaping surface.

In the description so far, the description was made on the premise of a usage increasing as much as possible thickness controllability of the molten pool (coating layer) using the point in which energy density of the beam irradiated on the straight line area drastically decreases at the time of defocus when the straight line area is made as narrow and sharp as possible. However, in this case, the coating layer becomes very thin, and when a layer of the same thickness is to be added, additive manufacturing (shaping) has to be performed separately on many layers (has to be repeatedly laminated frequently), which is a disadvantage from a productivity standpoint.

Figure 15A:
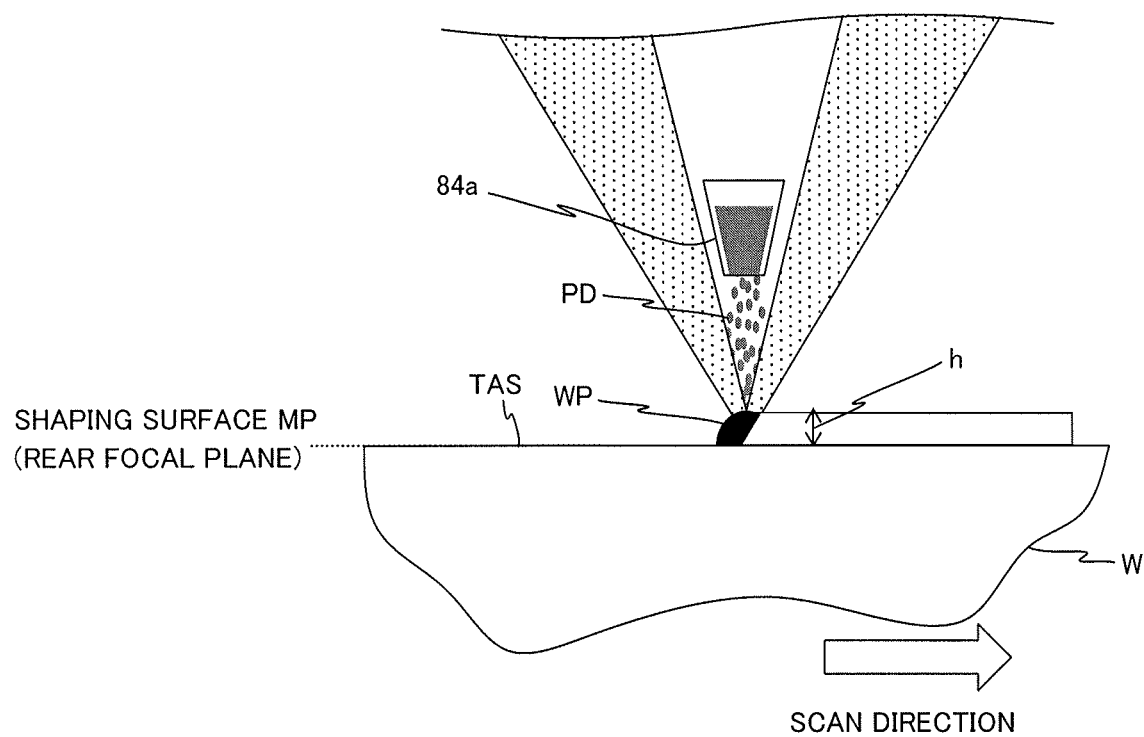
FIGS. 15A and 15B are views used to describe an example when increasing thickness of a coating layer by widening a width of a straight line area.
Figure 15B:
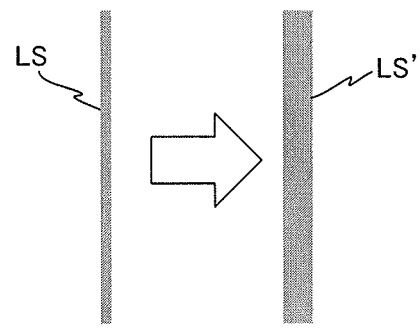

Consequently, there may be a case when the thickness of the coating layer needs to be increased taking into consideration a balance between the required shaping accuracy and throughput. In such a case, controller 600 changes the intensity distribution of the beam within the shaping surface according to the required shaping accuracy and the throughput, or specifically, may control the tilt angle of each mirror element $81_{p,q}$ of mirror array 30 so that the width of the straight line area widens slightly. For example, straight line area LS illustrated in FIG. 15B changes to straight line area LS'. This slows the energy density change at the time of defocus and increases thickness h of the high energy area in the vertical direction as is shown in FIG. 15A, which allows the thickness of the layer generated in one scan to be increased, thus improving productivity.

As is described so far, a major feature of shaping apparatus 100 according to the embodiment is that the device is more convenient with solutions that comply with the requirements at the actual processing site when compared to the conventional metal 3D printer.

Note that in the embodiment above, while the case has been described where mirror array 80 is used as the spatial light modulator, instead of this, a digital mirror device consisting of multiple digital micromirror devices (Digital Micromirror Device: DMD (registered trademark)) made based on MEMS technology that are disposed in a matrix shape to form a large area may be used. In such a case, it becomes difficult to measure the state of each mirror element (e.g. tilt angle) with an encoder or the like. In such a case, a detection system may be used that irradiates a detection light on the surface of the large area digital mirror device, receives the reflection light from the multiple mirror elements structuring the digital mirror device, and detects the state of each mirror element based on the intensity distribution of the reflection light. In this case, the detection system may be a system that detects each state of the multiple mirror elements based on image information acquired by imaging an image formed by the digital mirror device with an imaging means.

Note that in shaping apparatus 100 according to the embodiment above, a detection system 89 indicated by a virtual line in FIG. 11 may be used along with rotary encoder $83_{p,q}$. As this detection system 89, a detection system may be used that receives the reflection light from the multiple mirror elements $81_{p,q}$ structuring mirror array 80 via a beam splitter placed in between mirror array 80 and condensing optical system 82, and detects the state of each mirror element $81_{p,q}$ based on the intensity distribution of the reflection light. As the detection system, a system having a structure similar to the one disclosed in, for example, U.S. Pat. No. 8,456,624, can be used.

In addition, in the embodiment above, while the example was given of using a variable type mirror array 80 in which the tilt angle of the reflection surface of each mirror element $81_{p,q}$ with respect to the reference surface is variable, the embodiment is not limited to this, and a mirror array having a structure in which each mirror element is tiltable with respect to the reference surface and also displaceable in a direction orthogonal to the reference surface may be employed. In addition, each mirror element does not necessarily have to be tiltable with respect to the reference surface. The mirror array which is displaceable in the direction orthogonal to the reference surface in this manner is disclosed in, for example, U.S. Pat. No. 8,456,624. Other than this, a mirror array of a type having mirror elements that are each rotatable around two axes that are parallel to the reference surface and orthogonal to each other (that is, tilt angle in two directions that are orthogonal are variable) may be employed. The mirror array that can change the tilt angle in two directions that are orthogonal in the manner above is disclosed in, for example, U.S. Pat. No. 6,737,662. In these cases as well, the detection system disclosed in U.S. Pat. No. 8,456,624 can be used to detect the state of each mirror element.

Note that a detection system that irradiates a detection light on the surface of mirror array 80 and receives the reflection light from the multiple mirror elements $81_{p,q}$ structuring mirror array 80 may be used. Or, as the detection system, a sensor that individually detects the tilt angle and spacing of each mirror element with respect to the reference surface (base) may be provided at the mirror array (optical device).

Note that in the embodiment above, although the case has been described where the intensity distribution of the beam on the shaping surface is changed by individually controlling the incidence angle of the plurality of parallel beams incident on the pupil plane of condensing optical system 82, not all beams of the plurality of parallel beams incident on the pupil plane of condensing optical system 82 have to be controllable (changeable). Consequently, in the case such as controlling the incidence angle of the parallel beam incident on condensing optical system 82 using the mirror array similar to the embodiment described above, the state of the reflection surface (at least one of position and tilt angle) does not have to be variable in all mirror elements. In addition, in the embodiment above, although the case has been described where mirror array 80 is used for controlling the incidence angle of the plurality of parallel beams incident on condensing optical system 82, that is, for changing the intensity distribution of the beam on the shaping surface, instead of the mirror array, a spatial light modulator (non-emitting image display device) described below may be used. As a transmission type spatial light modulator, other than a transmission type liquid crystal display element (LCD: Liquid crystal display), an electrochromic display (ECD) and the like can be given as an example. In addition, as a reflection type spatial light modulator, other than the micromirror array described above, examples such as a reflection type liquid crystal display element, an electrophoretic display (EPD: Electro Phonetic Display), electronic paper (or electronic ink) and a diffraction type light valve (Grating Light Valve) can be given. In addition, in the embodiment above, although the case has been described where the mirror array (a kind of spatial light modulator) is used for changing the intensity distribution of the beam on the shaping surface, the spatial light modulator may be used for other purposes.

In addition, as is described above, although condensing optical system 82 preferably has a larger diameter, a condensing optical system with a numerical aperture NA smaller than 0.5 may also be used.

In addition, in the embodiment above, to control the intensity distribution of the beam, shaping apparatus 100 may be equipped with a sensor that can have the light receiving section arranged in or close to the rear focal plane of condensing optical system 62. For example, it is desirable that a CCD image sensor is loaded on table 12 and the CCD image sensor calibrates the intensity distribution (intensity distribution within the irradiation area in the shaping surface) of the beam at a proper frequency. In this case, while measurement may be performed in the state where the light receiving section of the sensor (e.g. table 12) is still, scan measurement in which the light receiving section of the sensor (e.g. table 12) receives the beam from condensing optical system 82 while moving may be performed. By performing measurement while the light receiving section of the sensor is moving, for example, finite pixel effects of CCDs and mirror arrays can be removed and correct measurement results can be acquired. As is described, by measuring the intensity distribution of the beam using the sensor that receives the beam from condensing optical system 82, the intensity distribution of the beam can be controlled considering variation factors such as thermal aberration of condensing optical system 82. In addition, by controlling mirror array 80 based on the results, the intensity distribution of the beam in the rear focal plane and the like of condensing optical system 82 can be set with good precision to a desired state.

Note that in the embodiment described above, although examples were given of the case where titanium and stainless steel powder were used as the shaping materials, not only iron powder or other metal powder but also powder other than metal such as powdered nylon, polypropylene, and ABS may also be used. In addition, in the case of using material other than powder, such as filler wire used in welding as the shaping material, this can be applied to shaping apparatus 100 according to the embodiment described above. However, in this case, instead of the supply system for supplying powder such as the powder cartridge and the nozzle unit, a wire feeding device and the like are to be provided.

In addition, in the embodiment above, although the case has been described where powdered shaping material PD is supplied from each of the plurality of supply ports $91_1$ of nozzle 84 along the Z-axis direction parallel to optical axis AX of condensing optical system 82, the embodiment is not limited to this, and the shaping material (powder) may be supplied from a direction tilted with respect to optical axis AX. Or, the shaping material (powder) may be supplied from a direction tilted with respect to the vertical direction.

Note that in shaping apparatus 100 of the embodiment described above, nozzle 84a that material processing section 530 is equipped with may have a recovery port (suction port) for collecting the powdered shaping material that was not melted, along with the supply port of the shaping material previously described.

While the example was described so far of adding a shape to an existing workpiece, the usage of shaping apparatus 100 according to the embodiment is not limited to this, and it is possible to generate a three-dimensional shape by shaping on table 12 where nothing exists similar to an ordinary 3D printer. This case is none other than applying additive manufacturing to a workpiece called "nothing". When shaping the three-dimensional shaped object on such table 12, by optically detecting alignment marks at a minimum of three places formed in advance on table 12 with mark detection system 56 (refer to FIG. 11) that measurement system 400 is equipped with, controller 600 only has to acquire position information in directions of 6-DOF of the target surface of the shaping set on table 12 and perform three-dimensional shaping while controlling the position and attitude of the target surface on table 12 with respect to (the irradiation area of) the beam based on the results.

Note that in the embodiment above, although the case has been described as an example where controller 600 controls each constituent part; movement system 200, measurement system 400, and beam shaping system 500, the embodiment is not limited to this, and the controller of the shaping system may be structured by a plurality of hardware that each include a processing device such as a microprocessor. In this case, the movement system 200, measurement system 400, and beam shaping system 500 may each have a processing device, or the controller may be a combination of a first processing device that controls two of movement system 200, measurement system 400, and beam shaping system 500 and a second processing device that controls the remaining one system. In any case, the processing devices are each in charge of a part of the functions of controller 600 described above. Or the controller of the shaping system may be structured by a processing device such as a plurality of microprocessors and a host computer that has overall control over these processing devices.

At least a part of the components in each of the embodiments above can be appropriately combined with at least other parts of the components in each of the embodiments above.

A part of the components does not have to be used in the components in each of the embodiments above. In addition, to the extent permitted by law, the disclosures of all publications and the U.S. patents related to exposure apparatuses and the like referred to in each of the embodiments above are incorporated herein by reference as a part of the present specification.

While the above-described embodiment of the present invention is the presently preferred embodiment thereof, those skilled in the art of lithography systems will readily recognize that numerous additions, modifications, and substitutions may be made to the above-described embodiment without departing from the spirit and scope thereof. It is intended that all such modifications, additions, and substitutions fall within the scope of the present invention, which is best defined by the claims appended below.

What is claimed is:

1. A shaping apparatus that forms a three-dimensional shaped object, the apparatus comprising:
    a Directed Energy Deposition (DED)-type shaping system that has a beam irradiation section which emits a beam to form a molten pool and a material supply section which supplies shaping material to an area irradiated with the beam by the beam irradiation section; and
    a controller that controls the Directed Energy Deposition (DED)-type shaping system, wherein
    the beam irradiation section includes at least one movable mirror,
    the controller is configured to:
        control the beam irradiation section to irradiate a first area with a first beam to form the molten pool and irradiate a second area which is different from the first area with a second beam,
        control the beam irradiation section to irradiate the first area with the first beam to form the molten pool and irradiate the second area which is different from the first area with the second beam by moving the movable mirror, and
        perform a shaping by controlling the material supply section to supply the shaping material to at least the first area having the molten boot which is irradiated with the first beam.

2. The shaping apparatus according to claim 1, wherein the at least one movable mirror of the beam irradiation section is a plurality of movable mirrors,
    the controller controls the beam irradiation section to irradiate the first area with the first beam and irradiate the second area which is different from the first area with the second beam by moving the plurality of movable mirrors.

3. The shaping apparatus according to claim 1, wherein the second area which is irradiated with the second beam is preheated.

4. The shaping apparatus according to claim 1, wherein the controller controls the beam irradiation section to emit the first beam after emitting the second beam.

5. The shaping apparatus according to claim 1, wherein the controller controls the beam irradiation section to irradiate the first area with the first beam and irradiate the second area with the second beam simultaneously.

6. The shaping apparatus according to claim 1, wherein the controller controls the beam irradiation section to irradiate a third area which is different from the first and second areas with a third beam.

7. The shaping apparatus according to claim 1, wherein the controller controls the beam irradiation section to irradiate a third area which is different from the first and second areas with a third beam,
    the third area is located on an opposite side of the second area with the first area in between.

8. The shaping apparatus according to claim 1, wherein the controller controls the beam irradiation section to irradiate a third area which is different from the first and second areas with a third beam,
    the controller controls the beam irradiation section to irradiate a portion to which a shaping is applied by the first beam with the third beam.

9. The shaping apparatus according to claim 1, wherein the controller controls the beam irradiation section to irradiate a third area which is different from the first and second areas with a third beam,
    a portion to which a shaping is applied is polished by the irradiation of the third beam.

10. The shaping apparatus according to claim 1, further comprising:
    a movement system that is configured to move a target portion which is shaped by the Directed Energy Deposition (DED)-type shaping system.

11. The shaping apparatus according to claim 1, wherein the beam irradiation section further includes a condensing optical system which emits the beam.

12. The shaping apparatus according to claim 11, wherein the controller is configured to change intensity distribution of the beam within a predetermined plane on an exit surface side of the condensing optical system.

13. The shaping apparatus according to claim 10, wherein the controller controls the movement system and the Directed Energy Deposition (DED)-type shaping system based on 3D data of a three-dimensional shaped object to be formed so that shaping is applied to the target portion by supplying the shaping material from the material supply section while relative movement of the target portion and the beam from the beam irradiation section is performed.

14. A shaping method of forming a three-dimensional shaped object by using the shaping apparatus of claim 1, the method comprising:
controlling the beam irradiation section of the Directed Energy Deposition (DED)-type shaping system by the controller to irradiate the first area with the first beam; and
controlling the beam irradiation section of the Directed Energy Deposition (DED)-type shaping system by the controller to irradiate the second area which is different from the first area with the second beam.

15. A shaping apparatus that forms a three-dimensional shaped object, the apparatus comprising:
a Directed Energy Deposition (DED)-type shaping system that has a beam irradiation section including an optical system which emits a beam and a material supply section which supplies shaping material to an area irradiated with the beam by the beam irradiation section;
a movement system that is configured to move a target portion which is shaped by the Directed Energy Deposition (DED)-type shaping system; and
a controller that controls the Directed Energy Deposition (DED)-type shaping system and the movement system, wherein
the beam irradiation section includes a movable reflection member,
the controller controls the movement system so that the target portion moves in a first direction in a predetermined plane,
the beam irradiation section is configured to irradiate a position which is away from an optical axis of the optical system in the predetermined plane with the beam by moving at least a part of the movable reflection member.

16. The shaping apparatus according to claim 15, wherein the movable reflection member includes a plurality of mirrors.

17. The shaping apparatus according to claim 16, wherein the beam irradiation section is configured to irradiate a first area with a first beam and irradiate a second area which is different from the first area with a second beam.

18. The shaping apparatus according to claim 15, wherein the beam irradiation section is configured to irradiate a position which is away from the optical axis in a second direction with the beam,
the second direction is a direction that intersects with the first direction.

19. The shaping apparatus according to claim 18, wherein the beam irradiation section is configured to emit a slit beam that extends in the second direction.

20. The shaping apparatus according to claim 15, wherein the optical system is a condensing optical system,
the controller is configured to change intensity distribution of the beam within a predetermined plane on an exit surface side of the condensing optical system.

21. The shaping apparatus according to claim 15, wherein the controller controls the movement system and the Directed Energy Deposition (DED)-type shaping system based on 3D data of a three-dimensional shaped object to be formed so that shaping is applied to the target portion by supplying the shaping material from the material supply section while relative movement of the target portion and the beam from the beam irradiation section is performed.

22. A shaping method of forming a three-dimensional shaped object by using the shaping apparatus of claim 15, the method comprising:
controlling the movement system by the controller so that the target portion moves in the first direction in the predetermined plane; and
controlling the beam irradiation section of the Directed Energy Deposition (DED)-type shaping system by the controller to irradiate a position which is away from an optical axis of the optical system with the beam by moving at least a part of the movable reflection member of the beam irradiation section.

* * * * *